(12) United States Patent
Murata et al.

(10) Patent No.: US 12,265,307 B2
(45) Date of Patent: Apr. 1, 2025

(54) LIQUID CRYSTAL DISPLAY DEVICE

(71) Applicant: Sharp Display Technology Corporation, Kameyama (JP)

(72) Inventors: Koji Murata, Kameyama (JP); Akira Hirai, Kameyama (JP); Hiroshi Tsuchiya, Kameyama (JP); Takashi Satoh, Kameyama (JP); Akira Sakai, Kameyama (JP); Shinji Shimada, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/239,090

(22) Filed: Aug. 28, 2023

(65) Prior Publication Data

US 2024/0111195 A1    Apr. 4, 2024

(30) Foreign Application Priority Data

Oct. 3, 2022  (JP) .................................. 2022-159552

(51) Int. Cl.
   *G02F 1/1362*  (2006.01)
   *G02F 1/13*  (2006.01)
(52) U.S. Cl.
   CPC ...... *G02F 1/136209* (2013.01); *G02F 1/1323* (2013.01)

(58) Field of Classification Search
   CPC ........................ G02F 1/1323; G02F 1/134381
   See application file for complete search history.

(56) References Cited

U.S. PATENT DOCUMENTS

| | | | |
|---|---|---|---|
| 2017/0059898 A1 | 3/2017 | Su et al. | |
| 2020/0326567 A1* | 10/2020 | Fang | G02F 1/133753 |
| 2021/0124223 A1 | 4/2021 | Murata et al. | |
| 2021/0286206 A1* | 9/2021 | Chung | G02F 1/1323 |

FOREIGN PATENT DOCUMENTS

| | | | | |
|---|---|---|---|---|
| CN | 106444104 A | * | 2/2017 | ........... G02F 1/1323 |
| JP | 2021-067852 A | | 4/2021 | |

* cited by examiner

*Primary Examiner* — Alexander P Gross
(74) *Attorney, Agent, or Firm* — ScienBiziP, P.C.

(57) ABSTRACT

Provided is a liquid crystal display device including a liquid crystal panel including in the following order an active matrix substrate, a liquid crystal layer, and a counter substrate. The active matrix substrate includes in the following order a first electrode and a second electrode including a first linear electrode portion extending in a first direction. The counter substrate includes a third electrode including second linear electrode portions extending in a second direction crossing the first direction, and a fourth electrode including an island-shaped electrode portion as a floating electrode. The island-shaped electrode portion is disposed between the second linear electrode portions in a plan view, overlaps an optical aperture of one of two pixels adjacent to each other along the second direction, and does not overlap an optical aperture of the other of the two pixels.

14 Claims, 20 Drawing Sheets

LIQUID CRYSTAL DISPLAY DEVICE

CROSS-REFERENCE TO RELATED APPLICATIONS

The present application claims priority under 35 U.S.C. § 119 to Japanese Patent Application No. 2022-159552 filed on Oct. 3, 2022, the contents of which are incorporated herein by reference in their entirety.

BACKGROUND OF THE INVENTION

Field of the Invention

The present disclosure relates to liquid crystal display devices.

Description of Related Art

Liquid crystal display devices are display devices each utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the composition is controlled. Such liquid crystal display devices have advantageous features such as thin profile, light weight, and low power consumption, and are therefore used in a variety of fields.

Studies to enhance the viewing angle characteristics of display devices have been made such that the same image can be observed regardless of whether the angle of observation is in a narrow viewing angle range or a wide viewing angle range. Meanwhile, a display method considered in terms of privacy protection is one that allows observation of an image in a narrow viewing angle range but makes the image difficult to observe in a wide viewing angle range. Such studies and consideration suggest a desire for display devices capable of switching between these modes, namely the public mode (wide viewing angle mode) that allows observation of the same image both in a narrow viewing angle range and in a wide viewing angle range and the privacy mode (narrow viewing angle mode) that allows observation of an image in the narrow viewing angle range but makes the image difficult to observe in the wide viewing angle range.

For example, JP 2021-67852 A discloses a liquid crystal display device capable of switching between a narrow viewing angle mode and a wide viewing angle mode by controlling voltage to be applied to a third voltage on a color filter substrate.

US 2017/0059898 A discloses a liquid crystal display device including a first substrate having a first electrode and a first alignment film, a liquid crystal layer, and a second substrate having a second electrode, a third electrode, and a second alignment film, and describes switching of a viewing angle by applying voltage to the first electrode.

BRIEF SUMMARY OF THE INVENTION

JP 2021-67852 A and US 2017/0059898 A described above do not study a method for obtaining an asymmetric viewing angle in the privacy mode.

In response to the above issues, an object of the present invention is to provide a liquid crystal display device capable of switching between a privacy mode and a public mode and achieving an asymmetric viewing angle in the case of display in the privacy mode.

(1) One embodiment of the present invention is directed to a display device including: a liquid crystal panel in which a plurality of pixels are arranged in a matrix pattern; and a control circuit, wherein the liquid crystal panel sequentially includes an active matrix substrate, a liquid crystal layer, and a counter substrate in the stated order, the active matrix substrate sequentially includes a first electrode and a second electrode in the stated order, the second electrode including a first linear electrode portion extending in a first direction, the counter substrate includes a third electrode and a fourth electrode, the third electrode including a plurality of second linear electrode portions extending in a second direction crossing the first direction, the fourth electrode including an island-shaped electrode portion as a floating electrode, the island-shaped electrode portion is disposed between the plurality of second linear electrode portions in a plan view, overlaps an optical aperture of one pixel of two pixels adjacent to each other along the second direction in the plurality of pixels, and does not overlap an optical aperture of the other pixel of the two pixels, and the control circuit performs control of switching between application of a driving voltage and application of a constant voltage to the third electrode.

(2) In an embodiment of the present invention, the liquid crystal display device includes the structure (1), and a length f, in the second direction, of a region of the island-shaped electrode portion overlapping the optical aperture of the one pixel is 3 μm or more.

(3) In an embodiment of the present invention, the liquid crystal display device includes the structure (1) or (2), the counter substrate further includes a black matrix including a portion extending in the second direction, the plurality of second linear electrode portions include a second linear electrode portion that does not overlap the portion of the black matrix extending in the second direction and overlaps an optical aperture of at least one of the plurality of pixels in a plan view, and an electrode width W, in a direction perpendicular to the second direction, of the second linear electrode portion overlapping the optical aperture of the at least one of the plurality of pixels is 2.5 μm or more and 10 μm or less.

(4) In an embodiment of the present invention, the liquid crystal display device includes the structure (1), (2), or (3), and a distance d, in a direction perpendicular to the second direction, between one of the second linear electrode portions and the island-shaped electrode portion adjacent to each other in a plan view is 2.5 μm or more and 7 μm or less.

(5) In an embodiment of the present invention, the liquid crystal display device includes the structure (1), (2), (3), or (4), an electrode width W of each of the second linear electrode portions in a direction perpendicular to the second direction, a distance d in a direction perpendicular to the second direction between one of the second linear electrode portions and the island-shaped electrode portion adjacent to each other in a plan view, a length f, in the second direction, of a region of the island-shaped electrode portion overlapping the optical aperture of the one pixel, and a width gx of the optical aperture in the second direction satisfy Formula (1) and Formula (2) as follows:

$$d < W \qquad \text{Formula (1)}$$

$$0.1 \times gx < 2 \times f \leq gx \qquad \text{Formula (2)}.$$

(6) In an embodiment of the present invention, the liquid crystal display device includes the structure (1), (2), (3), (4), or (5), and the fourth electrode is disposed in a layer in which the third electrode is disposed.

(7) In an embodiment of the present invention, the liquid crystal display device includes the structure (1), (2), (3), (4), (5), or (6), and the counter substrate further includes a black matrix on a side of the third electrode and the fourth electrode opposite to the liquid crystal layer.

(8) In an embodiment of the present invention, the liquid crystal display device includes the structure (1), (2), (3), (4), (5), (6), or (7), the liquid crystal panel is a first liquid crystal panel, the liquid crystal display device further comprises a second liquid crystal panel, and the second liquid crystal panel is a liquid crystal panel capable of switching between a privacy mode and a public mode and having an asymmetric viewing angle in the privacy mode.

(9) In an embodiment of the present invention, the liquid crystal display device includes the structure (1), (2), (3), (4), (5), (6), (7), or (8), the liquid crystal display device further includes a backlight on or behind a back surface of the liquid crystal panel, the backlight includes a light source and a light-shielding louver disposed closer to the liquid crystal panel than the light source is, the light-shielding louver includes a linear light-absorbing layer, and in a plan view, a direction in which the light-absorbing layer extends and the second direction are perpendicular to each other.

The present invention can provide a liquid crystal display device capable of switching between a privacy mode and a public mode and achieving an asymmetric viewing angle in the case of display in the privacy mode.

DETAILED DESCRIPTION OF THE INVENTION

Hereinafter, embodiments of the present invention are described. The present invention is not limited to the following embodiments. The design may be modified as appropriate within the range satisfying the configuration of the present invention. In the following description, components having the same or similar functions in different drawings are commonly provided with the same reference sign so as to appropriately avoid repetition of description. The embodiments in the present invention may be combined as appropriate without departing from the spirit of the present invention.

Embodiment 1

Figure 1:
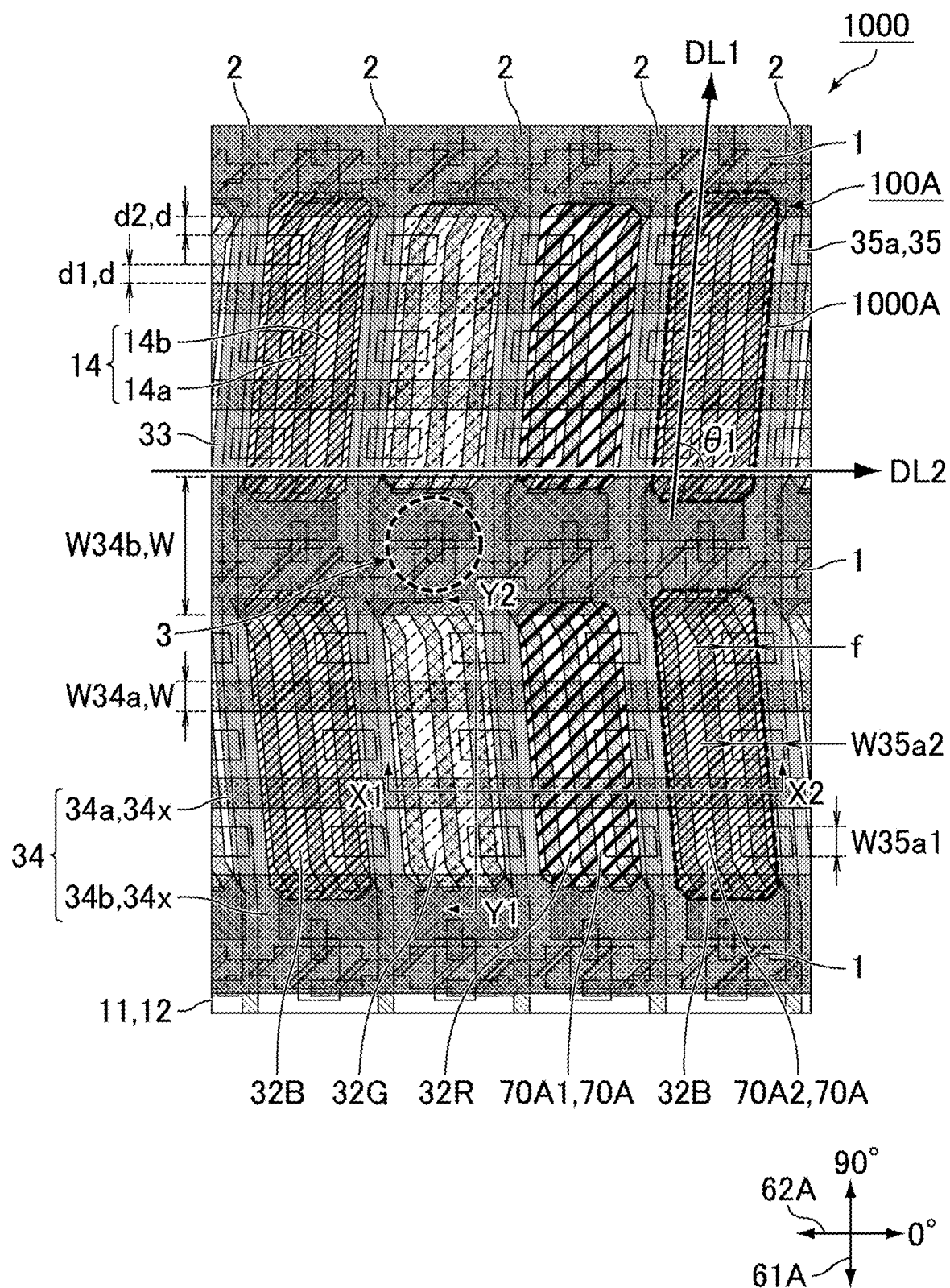
FIG. 1 is a schematic plan view illustrating an example of a liquid crystal display device of Embodiment 1.
Figure 2:
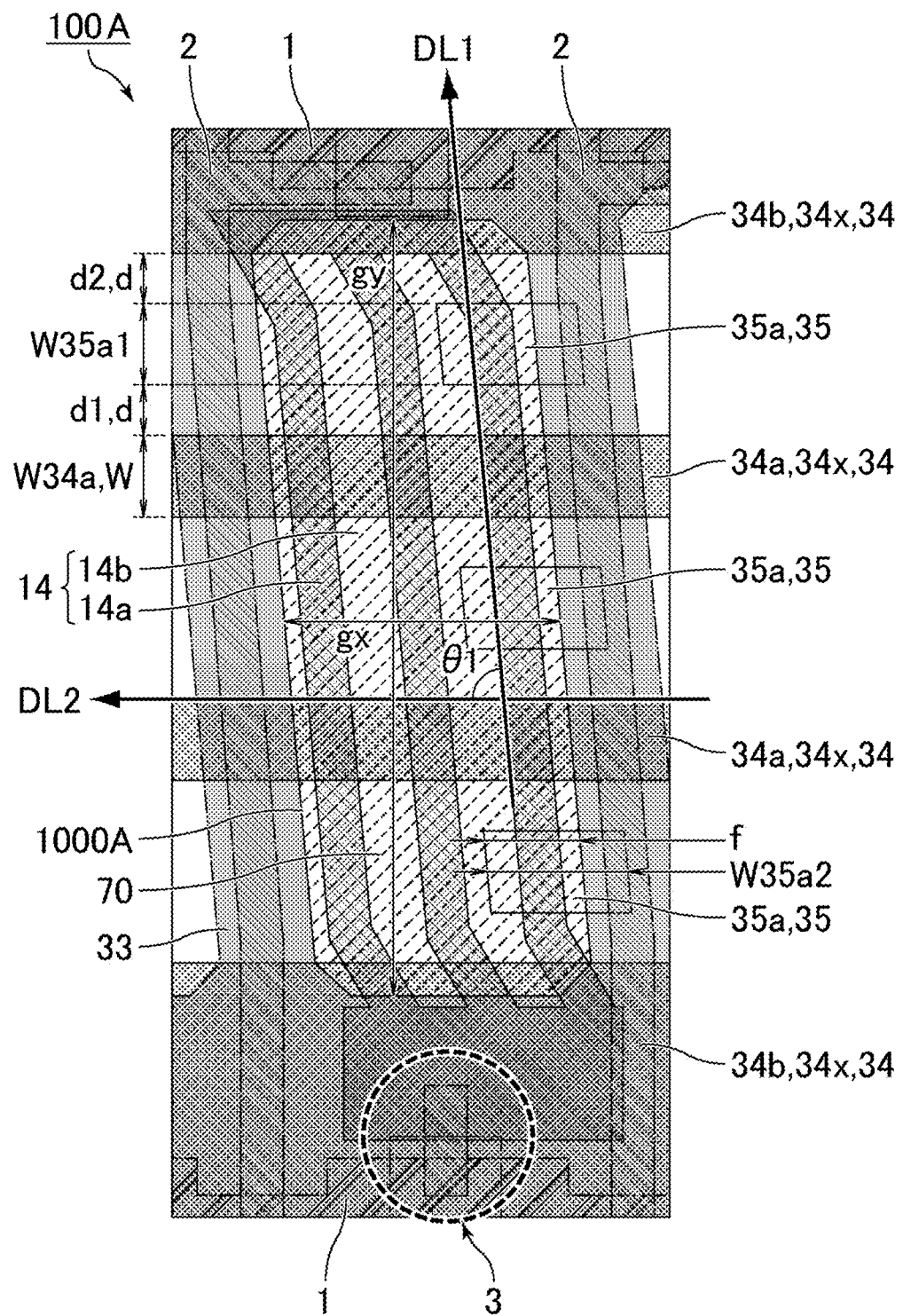
FIG. 2 is a schematic plan view of a pixel of the liquid crystal display device illustrated in FIG. 1.
Figure 3:
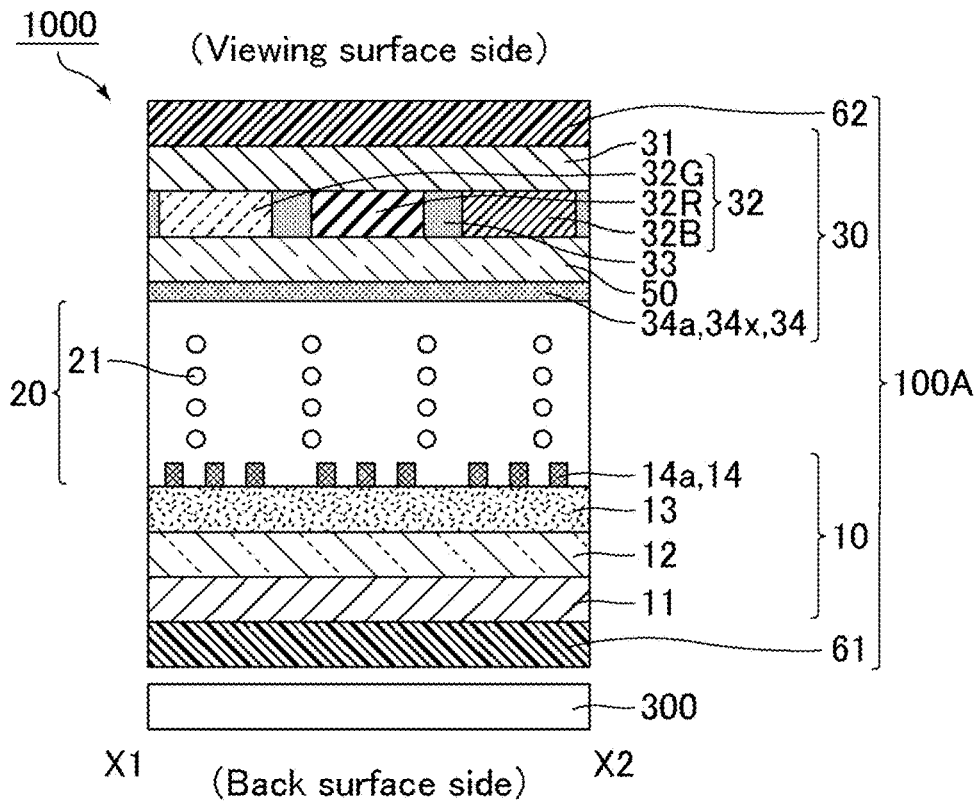
FIG. 3 is a schematic cross-sectional view taken along line X1-X2 in FIG. 1.
Figure 4:
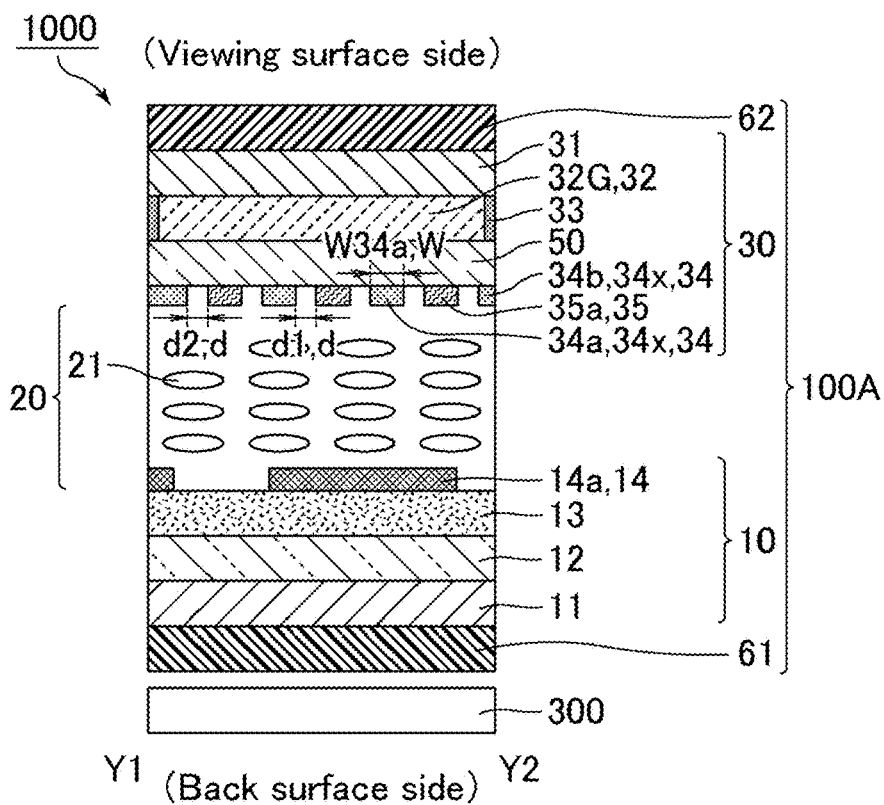
FIG. 4 is a schematic cross-sectional view taken along line Y1-Y2 in FIG. 1.

A liquid crystal display device of Embodiment 1 will be described hereinafter with reference to the drawings. FIG. 1 is a schematic plan view illustrating an example of the liquid crystal display device of Embodiment 1. FIG. 2 is a schematic plan view of a pixel of the liquid crystal display device illustrated in FIG. 1. FIG. 3 is a schematic cross-sectional view taken along line X1-X2 in FIG. 1. FIG. 4 is a schematic cross-sectional view taken along line Y1-Y2 in FIG. 1.

As illustrated in FIG. 1 to FIG. 4, a liquid crystal display device 1000 of the present embodiment is a liquid crystal display device including: a liquid crystal panel 100A in which a plurality of pixels 70A are arranged in a matrix pattern; and a control circuit. The liquid crystal panel 100A sequentially includes an active matrix substrate 10, a liquid crystal layer 20, and a counter substrate 30 in the stated order. The active matrix substrate 10 sequentially includes a first electrode 12, and a second electrode 14 including a first linear electrode portion 14a extending in a first direction DL1, in the stated order. The counter substrate 30 includes a third electrode 34 including a plurality of second linear electrode portions 34x extending in a second direction DL2 crossing the first direction DL1, and a fourth electrode 35 including island-shaped electrode portions 35a as floating electrodes. Each of the island-shaped electrode portions 35a is located between two of the plurality of second linear electrode portions 34x in a plan view, overlaps an optical aperture 1000A of a pixel 70A1 that is one of two pixels adjacent to each other along the second direction DL2 in the plurality of pixels 70A, and does not overlap an optical aperture 1000A of a pixel 70A2 that is the other of the two pixels. The control circuit performs control of switching application of a driving voltage and application of a constant voltage to the third electrode 34. This configuration can achieve switching between a privacy mode and a public mode and achieve an asymmetric viewing angle in the case of display of the privacy mode.

(Liquid Crystal Panel)

As illustrating FIG. 1 and FIG. 2, the liquid crystal display device 1000 of the present embodiment includes the liquid crystal panel 100A in which the plurality of pixels 70A are arranged in a matrix pattern. Each of the plurality of pixels 70A includes an optical aperture 1000A configured to allow light to transmit the liquid crystal panel 100A. The optical apertures 1000A are regions surrounded by dotted lines inside the pixels 70A illustrated in FIG. 1. In a case where the liquid crystal panel 100A is transmissive or transflective, the optical apertures 1000A allow light from a back surface of the liquid crystal panel 100A to pass therethrough toward the front surface of the liquid crystal panel 100A. In a case where the liquid crystal panel 100A is reflective or transflective, the optical aperture 1000A transmits incident light from the outside of the liquid crystal panel 100A, and reflected light obtained by reflecting the incident light inside the liquid crystal panel 100A and emitting the light toward the outside of the liquid crystal panel 100A. The optical apertures 1000A may overlap a transmissive member such as a polarizing plate or a color filter, for example, in a plan view. In the present embodiment, the case where the liquid crystal panel 100A is transmissive is described.

As illustrated in FIG. 3 and FIG. 4, the liquid crystal panel 100A sequentially includes, from the back surface side toward the viewing surface side, a first polarizing plate 61, the active matrix substrate 10, the liquid crystal layer 20, the counter substrate 30, and a second polarizing plate 62. The side closer to the screen (display surface) of the liquid crystal display device herein will also be referred to as a "viewing surface side (front side)," and the side farther from the screen (display surface) of the liquid crystal display device will also be referred to as a "back surface side." A view seen from a direction normal to the front surface side will also be referred to as a plan view.

The active matrix substrate 10 may include gate lines 1 and source lines 2 crossing the gate lines 1. A "pixel" herein refers to a region surrounded by two adjacent gate lines 1 and two adjacent source lines 2 as illustrated in FIG. 1. In a case where one pixel 70A1 is not particularly distinguished from another pixel 70A2 herein, these pixels will each be simply referred to as a pixel 70A. Thin film transistors (TFTs) 3 may be located as switching elements at or near intersections of the gate lines 1 and the source lines 2.

The active matrix substrate 10 sequentially includes the first electrode 12, a first insulating layer 13, and a second electrode in the stated order. More specifically, the active matrix substrate 10 sequentially includes a first support substrate 11, the first electrode 12, the first insulating layer 13, and the second electrode 14 in the stated order. The first electrode 12 and the second electrode 14 are stacked with the first insulating layer 13 in between, and constitute a fringe field switching (FFS) electrode structure. Examples of the material for the first insulating layer 13 include inorganic materials such as silicon oxide and silicon nitride. In the present embodiment, a configuration in which the second electrode 14 is disposed on the liquid crystal layer 20 side of the first electrode 12 is described.

One of the first electrode 12 and the second electrode 14 defines a common electrode, and the other electrode defines pixel electrodes.

The common electrode is an electrode formed on substantially the entire of one surface except for specific portions such as connection portions of drain electrodes of the TFTs 3 and pixel electrodes, irrespective of the boundary between the pixels 70A. A common signal kept at a constant value is supplied to the common electrode, and the common electrode is kept at a constant potential. The common electrode is preferably electrically coupled across the plurality of pixels 70A. The term "across the plurality of pixels 70A" means that the common electrode is disposed to overlap the plurality of pixels 70A across the boundaries between the plurality of pixels 70A in a plan view. Electrical coupling across the plurality of pixels 70A enables application of a common constant voltage to the plurality of pixels 70A.

The pixel electrodes are electrodes disposed in regions each surrounded by two adjacent gate lines 1 and two adjacent source lines 2. Each pixel electrode is disposed in the corresponding pixel 70A, and is electrically connected to the corresponding source line 2 through a semiconductor layer of the corresponding TFT 3, for example. Each pixel electrode is set at a potential in accordance with a data signal supplied through the corresponding TFT 3.

Each of the first electrode 12 and the second electrode 14 can be formed by depositing a transparent conductive material such as indium tin oxide (ITO), indium zinc oxide (IZO), zinc oxide (ZnO), or tin oxide (SnO) or an alloy of any of these materials in a single or multiple layers and then performing patterning with photolithography.

In the present embodiment, the first electrode 12 is preferably a solid electrode. The solid electrode refers to a flat-plate electrode in which none of a slit and an aperture is provided in at least a region overlapping optical apertures of the pixels in a plan view. The first electrode 12 preferably does not include any slits or apertures in a region overlapping the optical aperture 1000A of the plurality of pixels 70A in a plan view.

As illustrated in FIG. 1 and FIG. 2, the second electrode 14 includes a first linear electrode portion 14a extending in the first direction DL1. It is sufficient that at least a portion of the first linear electrode portion 14a extends in the first direction DL1 and the rest of the first linear electrode portion 14a may extend in a direction different from the first direction DL1. The first linear electrode portion 14a preferably overlaps the optical aperture 1000A of at least one of the plurality of pixels 70A in a plan view.

A plurality of the first linear electrode portions 14a may be provided. End portions of adjacent first linear electrode portions 14a may be connected by an electrode material, so that an opening surrounded by the electrode material is formed. The second electrode 14 may be a comb-teeth electrode in which the ends of adjacent first linear electrode portions 14a are open, or a slit may be provided between adjacent first linear electrode portions 14a. A slit or an aperture is preferably provided in a region of the second electrode 14 overlapping the optical apertures 1000A of the plurality of pixels 70A in a plan view. In the case illustrated in FIG. 1 and FIG. 2, end portions of the plurality of first linear electrode portions 14a are connected by an electrode material so that apertures 14b are formed.

The first linear electrode portion 14a may have a width of, for example, 2 to 5 μm. The slit or the aperture may have a width of, for example, 2 to 5 μm. The width of the first linear electrode portion 14a and the width of the slit or the aperture are widths each in a direction perpendicular to the first direction DL1.

Non-limiting examples of the first support substrate 11 and a second support substrate 31 described later include a resin substrate such as a polycarbonate substrate, and a glass substrate.

The liquid crystal layer 20 contains liquid crystal molecules 21. The liquid crystal molecules 21 are liquid crystal molecules whose anisotropy of dielectric constant (Δε) defined by the following formula (L) is positive. The liquid crystal molecules 21 are preferably homogeneously aligned with no voltage applied (no-voltage application state). The direction of the long axes of the liquid crystal molecules 21 in the no-voltage application state will also be referred to as the initial alignment direction of the liquid crystal molecules 21. The no-voltage application state includes a case where a voltage less than a threshold of the liquid crystal molecules 21 is applied to the liquid crystal layer 20.

$$\Delta\varepsilon = \text{(dielectric constant in long axis direction of liquid crystal molecules)} - \text{(dielectric constant in short axis direction of liquid crystal molecules)} \quad (L)$$

The counter substrate 30 includes the third electrode 34 and the fourth electrode 35. The counter substrate 30 also includes a black matrix 33 on a side of the third electrode 34 and the fourth electrode 35 opposite to the liquid crystal layer 20. This configuration can suppress a decrease in front contract ratio due to charging of the black matrix 33.

More specifically, the counter substrate 30 includes the second support substrate 31, the black matrix 33, color filters 32, the third electrode 34, and the fourth electrode 35. The counter substrate 30 will also be referred to as a color filter substrate. As illustrated in FIG. 4, the present embodiment is directed to the case where the counter substrate 30 sequentially includes the second support substrate 31, the black matrix 33, the color filters 32, and a first dielectric layer 50 in the stated order, and the third electrode 34 and the fourth electrode 35 are disposed on the first dielectric layer 50.

Each of the third electrode 34 and the fourth electrode 35 may be made of a transparent conductive material. Examples of the transparent conductive material includes ITO and IZO.

Application of a driving voltage to the third electrode 34 causes an electric field to be generated in the thickness direction of the liquid crystal layer 20 to enable switching between the privacy mode and the public mode. A display method will be described later.

In conventional liquid crystal display devices, when voltage is applied to an electrode provided in a counter substrate including a black matrix, the black matrix is charged, which results in a decrease in front contrast ratio in the privacy mode in some cases. On the other hand, in the present embodiment, although the counter substrate 30 including the black matrix 33 includes the third electrode 34, since the counter substrate 30 also includes the fourth electrode 35 including the island-shaped electrode portions 35a as floating electrodes, a decrease in front contrast ratio in the privacy mode can be suppressed. For example, the third electrode 34 overlaps the black matrix 33 in a plan view so that charging of the black matrix 33 thereby further increases, and in the present embodiment, the fourth electrode 35 can effectively suppress a decrease in front contrast ratio in the privacy mode.

As illustrated in FIG. 1 to FIG. 4, the third electrode 34 includes the plurality of second linear electrode portions 34x. Each of the plurality of second linear electrode portions 34x extends in the second direction DL2 crossing the first direction DL1 in a plan view. The first direction DL1 herein is a direction in which the first linear electrode portion 14a of the second electrode 14 extends. The second linear electrode portions 34x can also be considered to form stripes transverse to the first direction DL1. Since the second linear electrode portions 34x form transverse stripes, privacy protection can be enhanced, as compared to, for example, a case where the linear electrode portions are arranged in the same direction as the first direction DL1 (in the case of forming longitudinal stripes) or a case where the third electrode has the same shape as the black matrix. Specifically, the front contrast ratio in the case of display in the privacy mode can be increased, and the contrast ratio in the left-right direction (e.g., a case viewed at a polar angle of 45° at an azimuth of 0°-180°) can be reduced.

In this manner, the counter substrate 30 of the present embodiment includes the second linear electrode portions 34x as patterned electrodes (e.g., a plurality of electrodes forming transverse stripes along gate lines), and the island-shaped electrode portions 35a as electrodes in a floating dot pattern are arranged between the patterned electrodes with a gap of several micrometers. This configuration suppresses charging of the black matrix 33 upon application of voltage to the electrodes forming transverse stripes (in privacy mode), that is, enables suppression of generation of an unintended vertical electric field between the black matrix 33 and the active matrix substrate 10. Consequently, a high front contrast ratio and a low contrast ratio at a polar angle of 45° and at an azimuth of 0°-180° can be achieved in the privacy mode.

The first direction DL1 and the second direction DL2 form an angle θ1 of preferably 80° or more and 100° or less, more preferably 85° or more and 95° or less. The second direction DL2 may be parallel to a second absorption axis 62A of the second polarizing plate 62 or a first absorption axis 61A of the first polarizing plate 61. In the present embodiment, as illustrated in FIG. 1, the second direction DL2 is parallel to the second absorption axis 62A of the second polarizing plate 62 (at an azimuth of 0°-180°).

The plurality of second linear electrode portions 34x are preferably electrically connected to one another. The second linear electrode portions 34x may be, for example, connected to one another by connection portions in an end portion of the liquid crystal panel.

An electrode width W of each of the second linear electrode portions 34x in a direction perpendicular to the second direction DL2 is not limited and may be, for example, 2.5 μm or more and 10 μm or less.

In a plan view, the plurality of second linear electrode portions 34x preferably do not overlap a portion of the black matrix 33 extending in the second direction DL2 and preferably include a second linear electrode portion overlapping the optical aperture 1000A of at least one of the plurality of pixels 70A (hereinafter also referred to simply as "second linear electrode portion 34a overlapping the optical aperture"). This configuration can further reduce the contract ratio when seen in the left-right direction in the privacy mode.

An electrode width W (more specifically electrode width W34a) of the second linear electrode portion 34a overlapping the optical aperture in a direction perpendicular to the second direction DL2 is preferably 2.5 μm or more and 10 μm or less. This configuration can increase the front contrast ratio in the privacy mode and sufficiently reduce the contrast ratio in the left-right direction. A more preferable lower limit of the electrode width W34a of the second linear electrode portion 34a overlapping the optical aperture is 2.5 μm, and a more preferable upper limit thereof is 7 μm. To further increase the front contrast ratio in the public mode, the electrode width W34a of the second linear electrode portion 34a overlapping the optical aperture is more preferably 7 μm or less.

The second linear electrode portions 34x include the second linear electrode portion 34a overlapping the optical aperture described above and a second linear electrode portion 34b overlapping a black matrix described later. Thus, in the case of a second linear electrode portion 34x serving as the second linear electrode portion 34a overlapping the optical aperture, an electrode width W of the second linear electrode portion 34a in a direction perpendicular to the second direction DL2 will be more specifically referred to as the electrode width W34a. In the case of a second linear electrode portion 34x serving as the second linear electrode portion 34b overlapping the black matrix, an electrode width W of the second linear electrode portion 34b in a direction perpendicular to the second direction DL2 will be more specifically referred to as an electrode width W34b.

The plurality of second linear electrode portions 34x preferably include one or more second linear electrode portions 34a overlapping the optical apertures. In the case where the plurality of second linear electrode portions 34x include the plurality of second linear electrode portions 34a overlapping the optical apertures, the plurality of second linear electrode portions 34a overlapping the optical apertures are preferably connected to one another. The plurality of second linear electrode portions 34a overlapping the optical apertures may be connected by a connection portion in an end portion of the liquid crystal panel, for example.

In the case of including the plurality of second linear electrode portions 34a overlapping the optical apertures, the plurality of second linear electrode portions 34a overlapping the optical apertures are preferably arranged at regular intervals. A distance between adjacent second linear electrode portions 34a is preferably 2.5 μm or more and 7 μm or less. A more preferable lower limit of the distance between adjacent second linear electrode portions 34a is 3 μm, and a more preferable upper limit thereof is 5 μm.

In a plan view, it is also preferable for the plurality of second linear electrode portions 34x to include a second linear electrode portion overlapping a portion of the black matrix 33 extending in the second direction DL2 (hereinafter also referred to simply as "second linear electrode portion 34b overlapping the black matrix"). In this configuration, since the third electrode 34 includes a portion not overlapping the optical aperture 1000A of the pixel 70A and a vertical electric field is not likely to act in the optical aperture 1000A in display in the public mode, high transmittance and high contrast can be obtained.

The gate lines 1 described above may extend in the second direction DL2 that is a direction in which the second linear electrode portion 34b overlapping the black matrix extends. The second linear electrode portion 34b overlapping the black matrix may at least partially overlap the gate lines 1 in a plan view. To enhance privacy protection, the electrode width W34b of the second linear electrode portion 34b overlapping the black matrix may be larger than the width of each gate line 1.

The electrode width W34b of the second linear electrode portion 34b overlapping the black matrix is preferably larger than the electrode width W34a of the second linear electrode portion 34a overlapping the optical aperture. The electrode width W34b of the second linear electrode portion 34b overlapping the black matrix in a direction perpendicular to the second direction DL2 is preferably 5 μm or more. The upper limit of the electrode width W34b of the second linear electrode portion 34b overlapping the black matrix is not limited as long as the second linear electrode portion 34b does not overlap the optical aperture 1000A, and may be, for example, 50 μm. A more preferable lower limit of the electrode width W34b of the second linear electrode portion 34b overlapping the black matrix is 15 μm, and a more preferable upper limit thereof is 40 μm.

The plurality of second linear electrode portions 34x preferably include one or more second linear electrode portions 34b overlapping the black matrix. In the case where the plurality of second linear electrode portions 34x include a plurality of second linear electrode portions 34b overlapping the black matrix, the plurality of second linear electrode portions 34b overlapping the black matrix are preferably electrically connected to one another. The plurality of second linear electrode portions 34b may be connected by a connection portion in an end portion of the liquid crystal panel, for example.

In a case where the plurality of second linear electrode portions 34x include the second linear electrode portion 34a overlapping the optical aperture and the second linear electrode portion 34b overlapping the black matrix, the second linear electrode portion 34a overlapping the optical aperture is preferably electrically connected to the second linear electrode portion 34b overlapping the black matrix, and more preferably, the same voltage is applied as the entire third electrode 34.

The counter substrate 30 includes the fourth electrode 35 including the island-shaped electrode portions 35a as the floating electrodes. A floating electrode refers to an electrode not electrically connected to any of other electrodes and any power supply. A potential of the floating electrode is determined by the sum of capacitances of electrodes near the floating electrode. The fourth electrode 35 is not electrically connected to any of the first electrode 12, the second electrode 14, and the third electrode 34.

In a case where voltage is applied to an electrode in the counter substrate including the black matrix for display in the privacy mode, the black matrix is charged, so that an unintended electric filed is thereby generated in a liquid crystal layer in some cases. Consequently, light leakage occurs, leading to the possibility of a decrease in front contrast ratio in the privacy mode. On the other hand, in the present embodiment, since the counter substrate 30 includes the fourth electrode 35 including the island-shaped electrode portions 35a as floating electrodes, even when the black matrix 33 is charged, an electric field from the third electrode 34 toward the black matrix 33 is blocked or reduced in field intensity, thereby reducing an electric field effect on the liquid crystal layer 20. As a result, it is possible to suppress generation of an electric field displaced from the absorption axes of the polarizing plates between the black matrix 33 and the electrode in the active matrix substrate 10, leading to suppression of a decrease in front contrast ratio in the privacy mode.

An island-shaped electrode portion is shorter than a linear electrode portion, for example. Thus, since the fourth electrode 35 includes the island-shaped electrode portion 35a, an area not overlapping the optical aperture 1000A in a plan view can be increased as compared to the case where the fourth electrode 35 includes a linear electrode portion. Accordingly, transmittance in white display can be increased.

Non-limiting examples of the planar shape of each island-shaped electrode portion 35a include polygons such as a square, a rectangle, and a parallelogram, an oval, and a circle. Each island-shaped electrode portion 35a has an elongated shape, for example, and the lengthwise direction of the elongated shape extends along the second direction DL2.

An electrode width W35a1 of each island-shaped electrode portion 35a in a direction perpendicular to the second direction DL2 is preferably 2.5 µm or more and 7 µm or less. A more preferable lower limit of the electrode width W35a1 of each island-shaped electrode portion 35a is 3.5 µm, and a more preferable upper limit thereof is 5 µm from the viewpoint of manufacturing. The electrode width W35a1 is a maximum width of an electrode in a direction perpendicular to the second direction DL2.

An electrode width W35a2 of each island-shaped electrode portion 35a in the second direction DL2 is preferably 8 µm or more and 10 µm or less. A more preferable lower limit of the electrode width W35a2 of each island-shaped electrode portion 35a is 8.5 µm, and a more preferable upper limit thereof is 9.5 µm. The electrode width W35a2 is a maximum width of the electrode in the second direction DL2.

In the case where the fourth electrode 35 includes a plurality of island-shaped electrode portions 35a, the plurality of island-shaped electrode portions 35a are not in contact with one another in a plan view, and are preferably not electrically connected to one another.

The third electrode 34 and the fourth electrode 35 are preferably located between the black matrix 33 and the liquid crystal layer 20. In the case of disposing no fourth electrode 35, application of voltage to the third electrode 34 in the counter substrate causes an electric field not parallel or perpendicular to the absorption axes of the polarizing plates in a plan view to be generated between charged black matrix and the electrode in the active matrix substrate, so that longer axes (director) of liquid crystal molecules are thereby displaced from the absorption axes of the polarizing plates to cause disturbance of alignment of the liquid crystal molecules, resulting in occurrence of light leakage (misadjusted black level) when viewed from the front in black display in some cases. Consequently, the front contrast ratio in the privacy mode might decrease.

However, since the third electrode 34 and the fourth electrode 35 are disposed between the black matrix 33 and the liquid crystal layer 20, even when the black matrix 33 is charged, electric field effect on the liquid crystal layer 20 can be effectively reduced by effectively blocking an electric field from the third electrode 34 toward the black matrix 33 or reducing field intensity thereof. As a result, it is possible to effectively suppress generation of an electric field displaced from the absorption axes of the polarizing plates between the black matrix 33 and the electrode in the active matrix substrate 10, and higher front contrast ratio can be maintained.

The fourth electrode 35 is preferably disposed in the same layer as the third electrode 34 or between the third electrode 34 and the black matrix 33. FIG. 4 illustrates a case where both the third electrode 34 and the fourth electrode 35 are formed on the first dielectric layer 50 as an example in which the fourth electrode 35 is disposed in the same layer as the third electrode 34. The expression "disposed in the same layer" means that the third electrode 34 and the fourth electrode 35 are not stacked in a cross-sectional view of the liquid crystal panel, and any other layers such as an insulating layer are not interposed between the third electrode 34 and the fourth electrode 35. The configuration in which the third electrode 34 and the fourth electrode 35 are disposed in the same layer reduces the number of production steps and reduces manufacturing costs.

The island-shaped electrode portions 35a preferably overlap at least a portion of the black matrix 33. This configuration enables an increase of an area in which the island-shaped electrode portions 35a and the optical apertures 1000A of the pixels 70A do not overlap each other in a plan view, and transmittance in white display can be increased.

The island-shaped electrode portions 35a in the present embodiment are disposed between the plurality of second linear electrode portions 34x in a plan view. In this configuration, an electric field generated in the liquid crystal layer 20 is substantially parallel or substantially perpendicular to the absorption axis of a polarizing plate in a plan view. Thus, the contrast ratio in an oblique direction can be reduced with a high front contrast ratio maintained, and privacy protection can be enhanced in the privacy mode.

In the case where the fourth electrode 35 includes the plurality of island-shaped electrode portions 35a, the plurality of second linear electrode portions 34x and the plurality of island-shaped electrode portions 35a are preferably alternately arranged. In this configuration, an electric field generated in the liquid crystal layer 20 is substantially parallel or substantially perpendicular to the absorption axis of a polarizing plate in a plan view, and thus, the contrast ratio in an oblique direction can be reduced with a high front contrast ratio maintained, and privacy protection can be enhanced in the privacy mode. The direction in which these electrodes are alternately arranged may be a direction along the first direction DL1, for example.

In a plan view, each of the island-shaped electrode portions 35a overlaps the optical aperture 1000A of one pixel 70A1 of two pixels adjacent to each other along the second direction DL2 in the plurality of pixels 70A, and does not overlap the optical aperture 1000A of the other pixel 70A2. In this configuration, the effect of blocking an electric field from the third electrode 34 toward the black matrix 33 or reducing field intensity thereof is asymmetrically obtained in the left-right direction. Accordingly, an asymmetric viewing angle can be achieved in display in the privacy mode. An electrode structure overlapping the optical aperture 1000A of one pixel 70A1 of two pixels adjacent to each other along the second direction DL2 in the plurality of pixels 70A and not overlapping the optical aperture 1000A of the other pixel 70A2 can be regarded as an asymmetric structure.

In the manner described above, the counter substrate 30 of the present embodiment includes the second linear electrode portions 34x as a plurality of electrodes forming transverse stripes and the island-shaped electrode portions 35a as electrodes in a floating dot pattern formed with gaps between the electrodes forming transverse stripes. Each of the island-shaped electrode portions 35a extends out not to both but to one of the two pixels 70A1 and 70A2 adjacent to each other along the second direction DL2. This configuration can achieve a display device capable of switching between a wide viewing angle mode (public mode) unique to an IPS mode or an FFS mode and a narrow viewing angle mode with asymmetric contrast ratios (privacy mode with asymmetric contrast ratios) in which the contrast ratios are different in the left-right direction.

The markets of automated teller machine (ATM) and point of sales (POS) have a possible case in which switching to a privacy mode only at one side is sufficient in some installation environments of terminals (e.g., near a wall), and the liquid crystal display device 1000 of the present embodiment is suitable. Although it is difficult to apply bilaterally symmetric contrast ratio viewing angle characteristics to a privacy mode of a vehicle-mounted center information display (CID), bilaterally asymmetric contrast ratio viewing angle characteristics as described in the present embodiment enables application to the privacy mode of the vehicle-mounted CID, and switching between the public mode and the privacy mode on the driver's side is enabled.

None of JP 2021-67852 A and US 2017/0059898 A discloses that a counter substrate includes electrodes forming transverse stripes and electrodes in a floating dot pattern with an asymmetric structure.

A length (extension width) f, in the second direction DL2, of a region of each island-shaped electrode portion 35a overlapping the optical aperture 1000A of one pixel 70A1 is preferably 3 µm or more. This configuration can achieve an asymmetric viewing angle more effectively in the case of display of the privacy mode. The length f is more preferably 5 µm or more, even more preferably 6 µm or more.

The length f is preferably 8 µm or less. This configuration can enhance contrast ratio asymmetry in the left-right direction. The length f is more preferably 7.5 µm or less, even more preferably 7 µm or less.

The length f is preferably 3 µm or more and 8 µm or less, more preferably 5 µm or more and 7.5 µm or less, even more preferably 6 µm or more and 7 µm or less.

A distance d, in a direction perpendicular to the second direction DL2, between a second linear electrode portion 34x and an island-shaped electrode portion 35a adjacent to each other in a plan view is preferably 2.5 µm or more and 7 µm or less. This configuration can further reduce the contrast ratio in the left-right direction in the privacy mode. A more preferable lower limit of the distance d is 3 µm, and a more preferable upper limit thereof is 4 µm. To increase the front contrast ratio in the privacy mode, the distance d is more preferably 3.5 µm or less. The distance d is an average. An average herein is an arithmetic mean. For example, ten distances, in a direction perpendicular to the second direction DL2, between a second linear electrode portion 34x and an island-shaped electrode portion 35a adjacent to each other in a plan view are measured, and an arithmetic mean of these distances is obtained as the distance d.

Similarly, in the case where the second linear electrode portions 34x include the second linear electrode portion 34a overlapping the optical aperture, a distance d1, in a direction perpendicular to the second direction DL2, between the second linear electrode portion 34a overlapping the optical aperture and an island-shaped electrode portion 35a adjacent to each other in a plan view is preferably 2.5 µm or more and 7 µm or less. This configuration can further reduce the contrast ratio in the left-right direction in the privacy mode. A more preferable lower limit of the distance d1 is 3 µm, and a more preferable upper limit thereof is 4 µm. To increase the front contrast ratio in the privacy mode, the distance d1 is more preferably 3.5 µm or less. The distance d1 is an average. For example, ten distances, in a direction perpendicular to the second direction DL2, between the second linear electrode portion 34a overlapping the optical aperture and an island-shaped electrode portion 35a adjacent to each other in a plan view are measured, and an arithmetic mean of these distances is obtained as the distance d1.

Similarly, in the case where the second linear electrode portions 34x include the second linear electrode portion 34b overlapping the black matrix, a distance d2, in a direction perpendicular to the second direction DL2, between the second linear electrode portion 34b overlapping the black matrix and an island-shaped electrode portion 35a is preferably 2.5 µm or more and 7 µm or less. This configuration can further reduce the contrast ratio in the left-right direction in the privacy mode. A more preferable lower limit of the distance d2 is 3 µm, and a more preferable upper limit thereof is 4 µm. To enhance the front contrast ratio in the privacy mode, the distance d2 is more preferably 3.5 µm or less. The distance d2 is an average. For example, ten distances, in a direction perpendicular to the second direction DL2, between the second linear electrode portion 34b overlapping the black matrix and an island-shaped electrode portion 35a adjacent to each other in a plan view are measured, and an arithmetic mean of these distances is obtained as the distance d2.

The electrode width W of each second linear electrode portion 34x in a direction perpendicular to the second direction DL2, the distance d, in a direction perpendicular to the second direction DL2, between the second linear electrode portion 34x and an island-shaped electrode portion 35a adjacent to each other in a plan view, the length, f, in the second direction DL2, of a region of the island-shaped electrode portion 35a overlapping the optical aperture 1000A of one pixel 70A1, and a width gx of the optical aperture 1000A in the second direction DL2 preferably satisfy Formula (1) and Formula (2) below. This configuration can achieve an asymmetric viewing angle effectively in the case of display in the privacy mode.

$$d < W \qquad \text{Formula (1)}$$

$$0.1 \times gx < 2 \times f \leq gx \qquad \text{Formula (2)}$$

In the case where the second linear electrode portions 34x include the second linear electrode portion 34a overlapping the optical aperture, Formula (1) can be specifically expressed as Formula (1-1).

$$d1 < W34a \qquad \text{Formula (1-1)}$$

In the case where the second linear electrode portions 34x include the second linear electrode portion 34b overlapping the black matrix, Formula (1) can be specifically expressed as Formula (1-2).

$$d2 < W34b \qquad \text{Formula (1-2)}$$

The width gy of the optical aperture 1000A in a direction perpendicular to the second direction DL2 is not limited.

When the liquid crystal panel 100A is observed from the front surface side, the color filters 32 are disposed in the respective pixels 70A to overlap the corresponding optical aperture 1000A. The color filters 32 include, for example, a red color filter 32R, a green color filter 32G, and a blue color filter 32B. The color filters 32 may include color filters of the same color continuously arranged in a row direction or a column direction of the liquid crystal panel 100A. The color filters 32 preferably define a dielectric layer.

The black matrix 33 is disposed between the plurality of pixels 70A. The black matrix 33 may be disposed between the optical apertures 1000A adjacent to each other in the row direction or the column direction or may be disposed around each optical aperture 1000A in a plan view. The black matrix 33 may be any black matrix generally used in the field of liquid crystal display devices, and is preferably made of a resin, more preferably made of a black resin containing a black pigment or a black dye. The black matrix 33 has a specific resistance of, for example, $1.0 \times 10^{10}$ to $1.0 \times 10^{13}$ ($\Omega \cdot$cm).

The first dielectric layer 50 is preferably disposed between the black matrix 33 and the third electrode 34. The presence of the first dielectric layer 50 increases the distance between the black matrix 33 and the third electrode 34, and thus, charging of the black matrix 33 occurring upon application of voltage to the third electrode 34 can be reduced. The first dielectric layer 50 may have a dielectric constant $\varepsilon$ of 3 to 4, for example.

The first dielectric layer 50 is a layer different from the color filters 32 and is, for example, a layer of a resin having light transmittance. The first dielectric layer 50 preferably has a total light transmittance of 80% or more. The total light transmittance herein refers to a total light transmittance measured in conformity with JIS K7361-1. Examples of the first dielectric layer 50 include a resin such as acrylic resin and polyimide resin.

The first dielectric layer 50 preferably has a thickness of 0.5 µm or more and 4 µm or less. If the thickness of the first dielectric layer 50 is excessively large, parallax color mixture from an oblique side occurs, and a desired color cannot be obtained in some cases. On the other hand, if the thickness of the first dielectric layer 50 is 4 µm or more, unevenness is likely to occur on the surface of the first dielectric layer 50, and display unevenness might occur.

Although not shown, alignment films may be disposed, each between the active matrix substrate 10 and the liquid crystal layer 20 and between the counter substrate 30 and the liquid crystal layer 20. The alignment film controls initial alignment azimuth of liquid crystal molecules with no voltage applied. The alignment films are each preferably a horizontal alignment film. The horizontal alignment film is preferably one giving an initial pre-tilt angle of liquid crystal molecules (with no voltage applied to the liquid crystal layer) from the surface of the alignment film of 0° to 1°.

The first polarizing plate 61 and the second polarizing plate 62 may be respectively disposed on the side of the active matrix substrate 10 opposite to the liquid crystal layer 20 and the side of the counter substrate 30 opposite to the liquid crystal layer 20. The first absorption axis 61A of the first polarizing plate 61 and the second absorption axis 62A of the second polarizing plate 62 are preferably disposed in the crossed Nicols to be perpendicular to each other. The expression that two axes are "perpendicular" herein means that they form an angle (absolute value) of 80° or more and 90° or less, preferably 85° or more and 90° or less, more preferably 89° or more and 90° or less, and particularly preferably 90° (perfectly perpendicular). In FIG. 1, the second absorption axis 62A of the second polarizing plate 62 is at an azimuth of 0°-180°, and the first absorption axis 61A of the first polarizing plate 61 is at an azimuth of 90°-270°. The first polarizing plate 61 and the second polarizing plate 62 are preferably linear polarizing plates.

Figure 5:
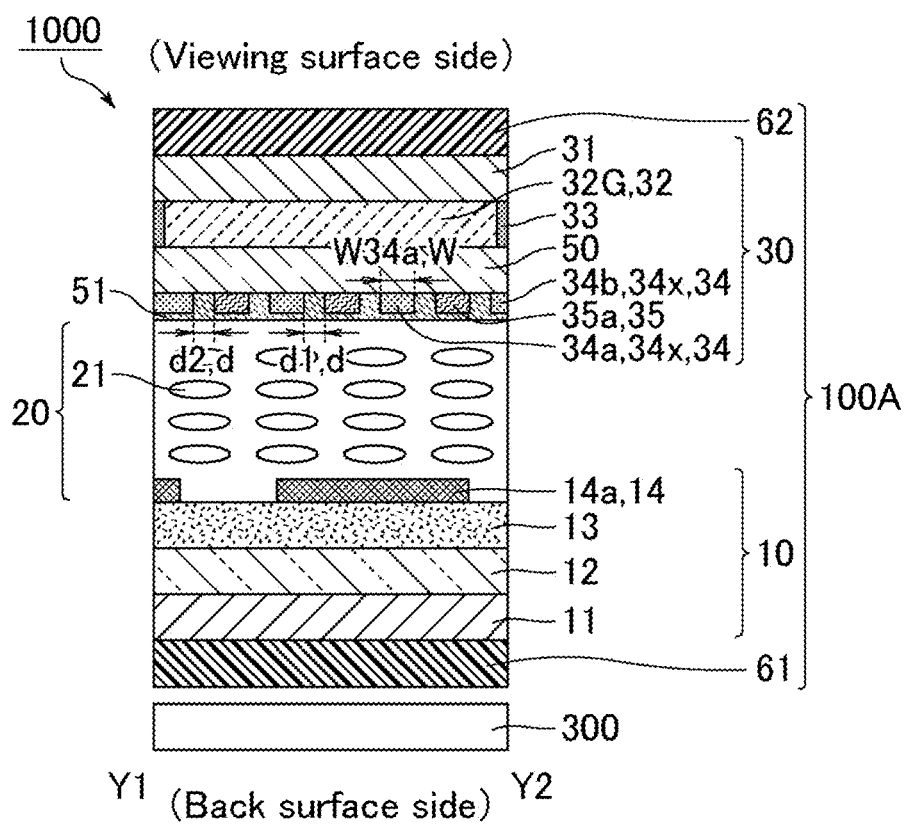
FIG. 5 is a schematic cross-sectional view illustrating an example in which a dielectric layer (second dielectric layer) is placed in the liquid crystal panel illustrated in FIG. 4.

FIG. 5 is a schematic cross-sectional view illustrating an example in which a dielectric layer (second dielectric layer) is placed in the liquid crystal panel illustrated in FIG. 4. As illustrated in FIG. 5, the liquid crystal panel 100A may include a dielectric layer (second dielectric layer 51) between the third electrode 34 and the liquid crystal layer 20. The second dielectric layer 51 is a layer different from an alignment film, and is preferably disposed between the third electrode 34 and an alignment film. FIG. 5 illustrates an example in which the second dielectric layer 51 is disposed between the third electrode 34 (second linear electrode portions 34x) and the liquid crystal layer 20 and between the fourth electrode 35 (island-shaped electrode portions 35a) and the liquid crystal layer 20.

The presence of the second dielectric layer 51 can suppress occurrence of an unnecessary vertical electric field unintentionally generated between the third electrode 34 and the electrode in the active matrix substrate 10 in the public mode. Consequently, horizontal electric field driving can be obtained with the liquid crystal molecules 21 hardly rising, and thus, transmittance and front contrast ratio in white display at the front in the case of display in the public mode can be increased. The second dielectric layer 51 may be made of the same or substantially the same material as the first dielectric layer 50. The second dielectric layer 51 preferably has a total light transmittance of 80% or more.

The second dielectric layer 51 may have a dielectric constant $\varepsilon$ of 3 to 4, for example. The second dielectric layer 51 preferably has a thickness of 0.5 µm or more and 4 µm or less. When the thickness exceeds 4 µm, parallax color mixture might occur to degrade display quality.

The liquid crystal display device 1000 of the present embodiment may include a backlight 300 on or behind the back surface side (active matrix substrate 10 side) of the liquid crystal panel 100A. The backlight 300 is not limited and may be a backlight generally used in the field of liquid crystal display devices. The backlight 300 may be a transmissive type or an edge-lit type. To further enhance privacy protection in the privacy mode, the backlight 300 may be a backlight including a light-shielding louver described later.

The liquid crystal panel 100A of the present embodiment may be an in-cell touch panel. In the case where the liquid crystal panel 100A is an in-cell touch panel, the active matrix substrate 10 may further include touch panel lines. The touch panel lines may be, for example, disposed to overlap the source lines 2 in a width substantially equal to the source lines 2 in a plan view. The touch panel lines may be disposed between the first electrode 12 and the second electrode 14 in a cross-sectional view. Since the fourth electrode 35 is in a floating state, a signal-to-noise ratio (S/N ratio) can be increased irrespective of resistance of the fourth electrode 35. Thus, it is possible to obtain capacitance between a finger and the touch panel lines while preventing charging of the black matrix 33.

Next, a control circuit, a display method, and veil-view display of the liquid crystal display device 1000 of the present embodiment will be described hereinafter.

(Control Circuit)

A control circuit can switch between a first display mode of displaying a first image that can be seen in a narrow viewing angle range including a direction normal to the liquid crystal panel and a second display mode of enabling the first image to be seen in a wide viewing angle range including the narrow viewing angle range.

The first display mode herein will also be referred to as a privacy mode, and the second display mode will also be referred to as the public mode. In the narrow viewing angle range, in the case of observing the liquid crystal panel at a polar angle in the left-right direction (an azimuth of 0° or an azimuth of 180°), the contrast ratio is preferably 5 or less. Assuming a direction perpendicular to the surface of the liquid crystal panel is a polar angle of 0°, and a direction horizontal to the surface of the liquid crystal panel is a polar angle of 90°, for example, the polar angle is preferably 60° or more, more preferably 45° or more, even more preferably 30° or more. The wide viewing angle range refers to a range of a polar angle larger than a polar angle in the narrow viewing angle range described above.

Figure 6:
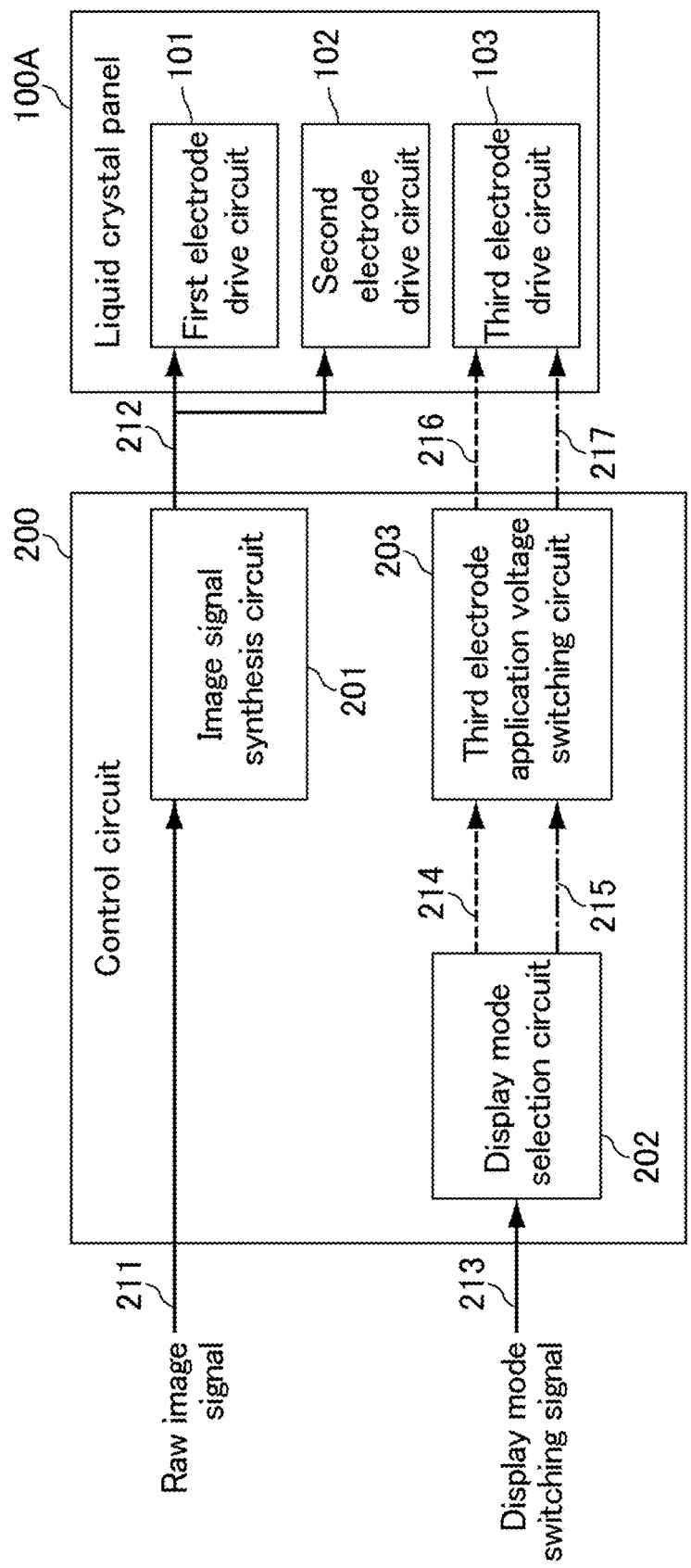
FIG. 6 is a block diagram schematically illustrating display methods in a first display mode and a second display mode of the liquid crystal display device of Embodiment 1.

FIG. 6 is a block diagram schematically illustrating display methods in the first display mode and the second display mode of the liquid crystal display device of Embodiment 1. As illustrated in FIG. 6, the liquid crystal display device 1000 of the present embodiment includes the liquid crystal panel 100A and a control circuit 200.

The liquid crystal panel may include a first electrode drive circuit 101 that applies voltage to the first electrode 12, a second electrode drive circuit 102 that applies voltage to the second electrode 14, and a third electrode drive circuit 103 that applies voltage to the third electrode 34. The control circuit 200 may include an image signal synthesis circuit 201, a display mode selection circuit 202, and a third electrode application voltage switching circuit 203.

The control circuit 200 performs control of applying a driving voltage to the third electrode 34 in the first display mode (privacy mode), and performs control of applying a constant voltage to the third electrode 34 in the second display mode (public mode). The constant voltage is an alternating-current (AC) voltage, and can be set such that a constant voltage is output irrespective of the magnitude of an impedance of the third electrode 34. A value of voltage (AC voltage) to be applied to the first electrode 12 and the second electrode 14 is determined assuming the constant voltage is a common voltage with respect to the third electrode 34. Assuming the constant voltage is a common voltage Vcom of 0 V, for example, a Vcom voltage is applied to the first electrode 12, and an AC voltage of Vcom±α [V] (where α is a voltage value of 0 V or more; frequency is 60 Hz) is applied to the second electrode 14 as a driving voltage. Then, a fringe electric field in which an electric field direction is reversed in a cycle of 60 Hz is exerted between the first electrode 12 and the second electrode 14.

In the privacy mode, a driving voltage applied to the third electrode 34 is an AC voltage having an effective value larger than that of the constant voltage, and application of the AC voltage to the third electrode 34 enables a vertical electric field with the first electrode 12 (or second electrode 14) to which the common voltage is applied. The driving voltage may be an AC voltage having an effective value larger than that of the constant voltage by 3 to 7.5 V. To suppress a phenomenon (image sticking) in which an afterimage of a display image remains in the privacy mode, the driving voltage applied to the third electrode 34 is preferably an AC voltage of Vcom±α [V] (where α is a voltage value of 0 V or more; frequency is 120 Hz). This means that a frequency f1 [Hz] of the driving voltage of the second electrode 14 and a frequency f2 [Hz] of the driving voltage of the third electrode 34 have a relationship of 2×f1=f2.

The image signal synthesis circuit 201 receives a raw image signal 211 for displaying a desired image and outputs an image signal 212 in accordance with the received raw image signal 211, to the first electrode drive circuit 101 and the second electrode drive circuit 102.

The display mode selection circuit 202 receives a display mode switching signal 213 for switching between the first display mode and the second display mode. In the case of selecting the first display mode, the display mode selection circuit 202 outputs a first display mode selection signal 214 to the third electrode application voltage switching circuit 203. In the case of selecting the second display mode, the display mode selection circuit 202 outputs a second display mode selection signal 215 to the third electrode application voltage switching circuit 203.

The third electrode application voltage switching circuit 203 inputs a driving voltage signal 216 or a constant voltage signal 217 to the third electrode drive circuit 103 in accordance with the received display mode selection signal, and switches between application of a driving voltage and application of a constant voltage to the third electrode 34. When receiving the first display mode selection signal 214 from the display mode selection circuit 202, the third electrode application voltage switching circuit 203 outputs the driving voltage signal 216 to the third electrode drive circuit 103, and a predetermined AC voltage is applied to the third electrode 34. When receiving the second display mode selection signal 215 from the display mode selection circuit 202, the third electrode application voltage switching circuit 203 outputs the constant voltage signal 217 to the third electrode drive circuit 103, and a predetermined constant voltage is applied to the third electrode 34.

(Display Method)

An example of a display method of the first display mode and the second display mode will be hereinafter described. First, in a no-voltage application state where no voltage is applied to the liquid crystal layer, the liquid crystal molecules are horizontally aligned to the active matrix substrate 10. The expression "horizontally" means that a tilt angle (including pre-tilt angle) of liquid crystal molecules is 0° to 5°, preferably 0° to 3°, more preferably 0° to 1°, to the surface of the active matrix substrate 10 or the counter substrate 30. The tilt angle of liquid crystal molecules refers to an angle of a tilt of longer axes of the liquid crystal molecules to the surface of the active matrix substrate 10.

In the case of black display in the public mode, the control circuit 200 applies a predetermined AC voltage to the third electrode 34 as a constant voltage. The control circuit 200 performs control of applying a common voltage common to a constant voltage to the second electrode 14 and the first electrode 12 with the constant voltage set at 0 V. The common voltage applied to the second electrode 14 and the first electrode 12 may be the same as the constant voltage, or a voltage less than a threshold of liquid crystal molecules may be applied to the constant voltage. This state is also referred to as a no-voltage application state. In the no-voltage application state, an electric field that drives liquid crystal molecules is not generated in the liquid crystal layer 20, and thus, the liquid crystal molecules are aligned at an initial alignment azimuth. Since the alignment azimuth of liquid crystal molecules does not change in the plane of the liquid crystal layer 20, the liquid crystal panel does not transmit light from the back surface and provides black display. Black display refers to a display state with a lowest luminance (grayscale value of 0). White display refers to a display state with a highest luminance (grayscale value of 255). The initial alignment azimuth is preferably parallel to the active matrix substrate 10 and parallel to the first absorption axis 61A of the first polarizing plate 61 or the second absorption axis 62A of the second polarizing plate 62 in a plan view.

In the case of white display in the public mode, for example, the control circuit performs control of applying a constant voltage (common voltage) to one of the first electrode 12 and the second electrode 14 with a constant voltage applied to the third electrode 34 and applying an AC voltage with an effective value different from that of the common voltage is applied to the other. A fringe electric field is formed between the first electrode 12 and the second electrode 14, whereas unlike the privacy mode described later, an electric field in the thickness direction of the liquid crystal layer 20 is small. Thus, the electric field formed between the first electrode 12 and the second electrode 14 causes liquid crystal molecules to align at a different azimuth while aligning parallelly to the active matrix substrate 10. Once the liquid crystal molecules rotate in the plane of the liquid crystal layer 20 to align at an azimuth different from the initial alignment azimuth, the long axis direction of the liquid crystal molecules forms an angle with the first absorption axis 61A of the first polarizing plate and the second absorption axis 62A of the second polarizing plate, and light from the back surface of the liquid crystal panel is transmitted, whereby white display is provided.

In the case of black display in the privacy mode, the control circuit performs control of applying a driving voltage with an effective value different from the constant voltage to the third electrode and applying a constant voltage (common voltage) to the second electrode 14 and the first electrode 12. An oblique electric field is formed between the third electrode 34 and each of the first electrode 12 and the second electrode 14. With the oblique electric field, liquid crystal molecules form an angle to the active matrix substrate 10.

Since the alignment azimuth of liquid crystal molecules does not change in the plane of the liquid crystal layer 20, the liquid crystal panel does not transmit light from the back surface, whereas since the liquid crystal molecules form an angle to the active matrix substrate, when the liquid crystal panel is observed in a wide viewing angle range, the observed display is closer to white than black display observed in a narrow viewing angle range.

In the case of white display in the privacy mode, the control circuit 200 performs control of applying a constant voltage (common voltage) to one of the first electrode 12 and the second electrode 14 with a driving voltage applied to the third electrode 34 and applying an AC voltage with an effective value different from that of the common voltage to the other. The effective value of the driving voltage applied to the third electrode 34 is preferably different from that of the AC voltage applied to the first electrode 12 or the second electrode 14 and larger than that of the AC voltage applied to the first electrode 12 and the second electrode 14.

The driving voltage applied to the third electrode 34 may be different in frequency from the AC voltage applied to the first electrode 12 or the second electrode 14, and the frequency of the driving voltage may be higher than the frequency of the AC voltage applied to the first electrode 12 or the second electrode 14. The frequency of the driving voltage may be 60 Hz or 120 Hz, and the frequency of the AC voltage applied to the first electrode 12 or the second electrode 14 may be 60 Hz. When the frequency of the driving voltage is 120 Hz, flicker can be reduced.

A fringe electric field is formed between the first electrode 12 and the second electrode 14, and an oblique electric field to the thickness direction of the liquid crystal layer 20 is formed between the third electrode 34 and the first electrode 12 or between the third electrode 34 and the second electrode 14. Consequently, an electric field obtained by synthesizing the fringe electric field and the oblique electric field is formed in the liquid crystal layer 20, and thus, liquid crystal molecules align at a different azimuth while forming an angle to the active matrix substrate 10 by the electric field formed between the first electrode 12, the second electrode 14, and the third electrode 34. This provides white display. Since the liquid crystal molecules form an angle to the active matrix substrate, a first image is observed in a narrow viewing angle range, whereas when the liquid crystal panel is observed in a wide viewing angle range, a change of the image such as an excessive decrease in contrast ratio is obtained, and it is difficult to observe the first image.

In the case of performing black display and white display in the privacy mode, grayscale display is performed with a constant voltage applied to the third electrode 34 as described above. In conventional liquid crystal display devices, when a voltage is applied to an electrode in a color filter substrate, a black matrix in the color filter substrate is charged, and an electric field displaced from absorption axes of polarizing plates is formed between the charged black matrix and an electrode in an active matrix substrate in some cases. When such an electric field is generated, alignment of liquid crystal molecules is partially disturbed during black display in the privacy mode, and light leakage might occur. In the present embodiment, the presence of the fourth electrode in the floating state can block an electric field from the third electrode 34 toward the black matrix 33 or reduce field intensity to suppress occurrence of an electric field displaced from the absorption axes of the polarizing plates between the black matrix 33 and the electrode in the active matrix substrate 10. Thus, occurrent of the light leakage can be prevented.

Switching can be performed between the white display in the privacy mode and the white display in the public mode described above by applying voltage to the third electrode. Similarly, switching can be performed between black display in the privacy mode and black display in the public mode by applying voltage to the third electrode. The same holds for display in intermediate shades of gray.

As described above, the liquid crystal display device 1000 of the present embodiment can obtain high privacy protection when viewed from the left-right direction of the liquid crystal display by switching from the second display mode (public mode) to the first display mode (privacy mode). The left-right direction refers to an azimuth of 0° and an azimuth of 180° in a case where the rightward direction of the liquid crystal panel displaying a desired image is 0° and the angle increases counterclockwise.

(Veil-View Display)

Figure 7:
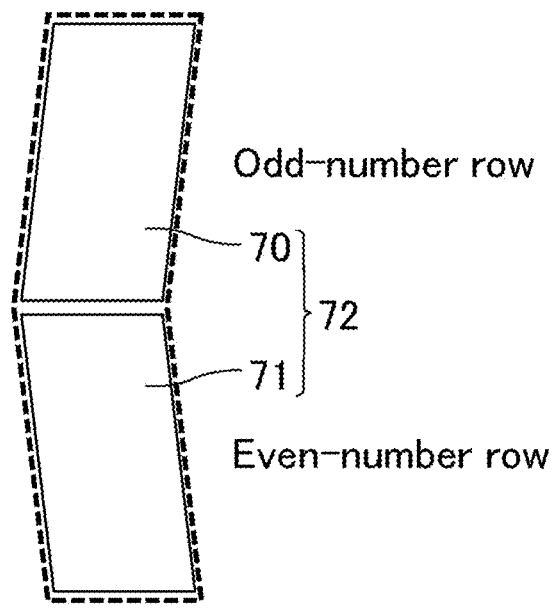
FIG. 7 is a schematic plan view illustrating an example of a display unit of a liquid crystal panel.
Figure 8:
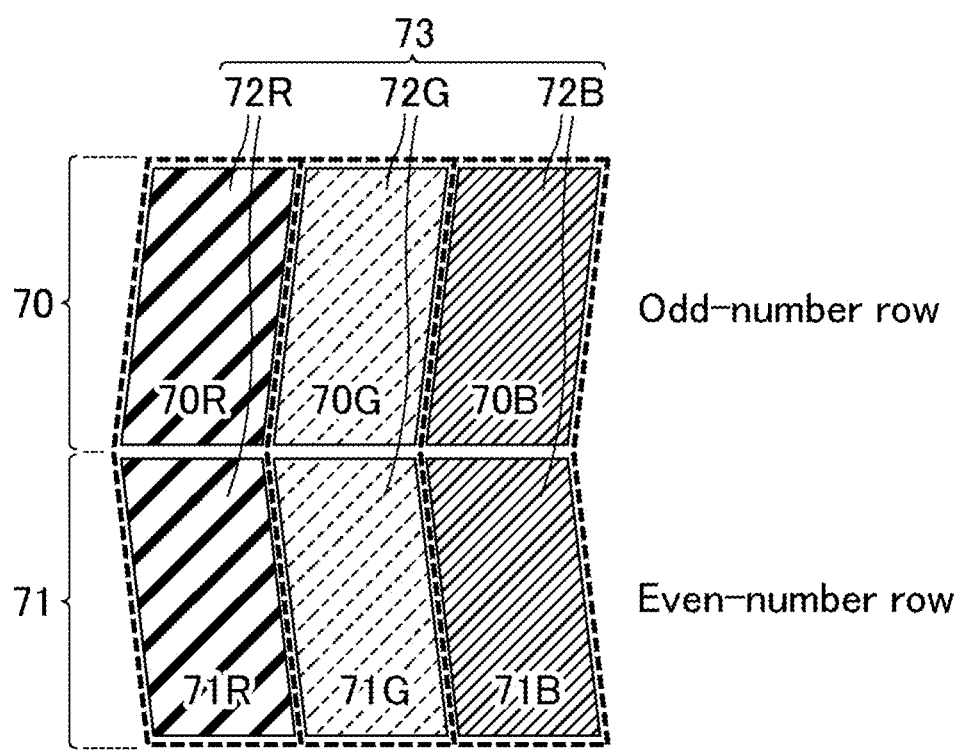
FIG. 8 is a schematic plan view illustrating an example of a color element in the case of performing color display by a soft veil-view function.
Figure 9:
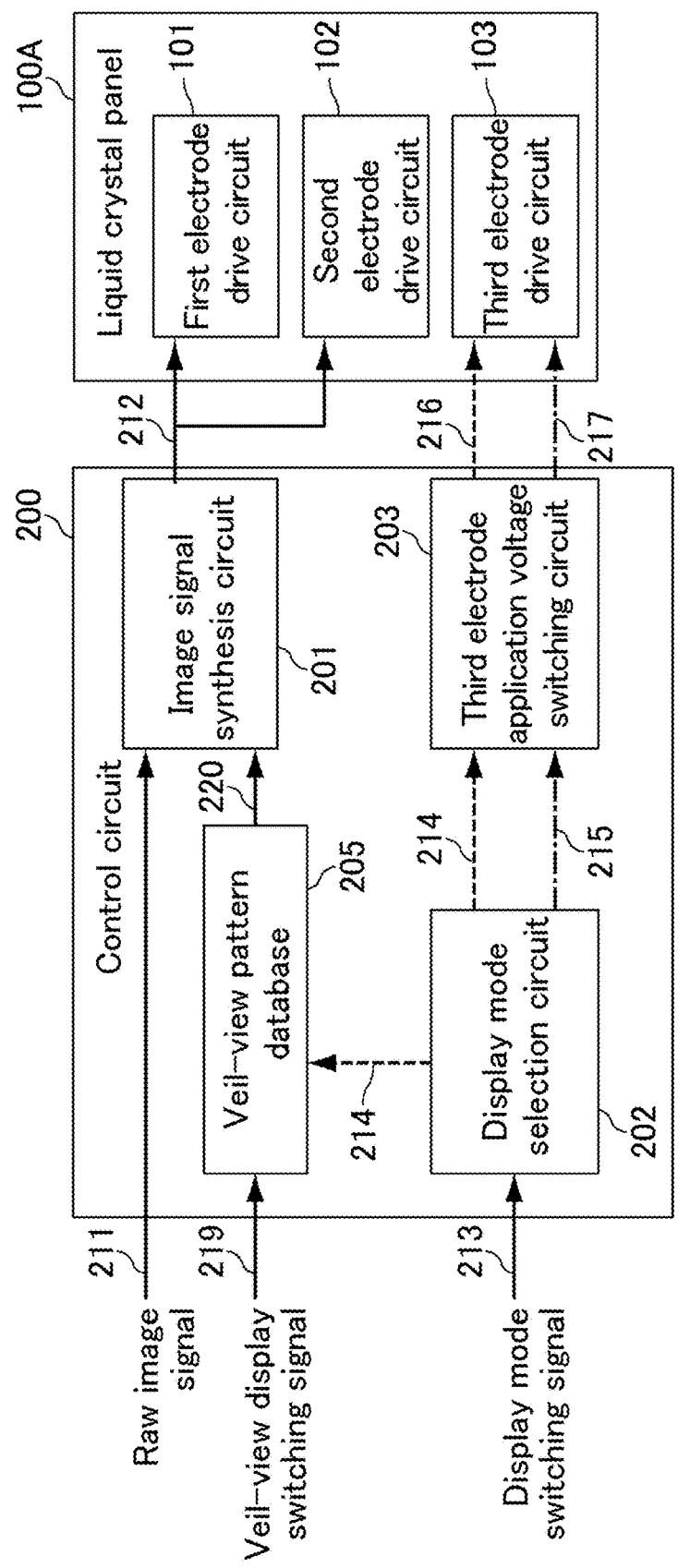
FIG. 9 is a block diagram schematically illustrating a display method in the case of displaying a veil-view pattern in the liquid crystal display device of Embodiment 1.

In addition to the switching of the display mode, a soft veil-view function described later may be combined. The soft veil-view function refers to the function of displaying a specific veil-view pattern by software. For example, the control circuit may be driven by software to display a veil-view pattern. An example of a method for displaying an image by the soft veil-view function will be described hereinafter with reference to FIG. 7 to FIG. 9. FIG. 7 is a schematic plan view illustrating an example of a display unit of the liquid crystal panel. FIG. 8 is a schematic plan view illustrating an example of a color element in the case of performing color display by a soft veil-view function. FIG. 9 is a block diagram schematically illustrating a display method in the case of displaying a veil-view pattern in the liquid crystal display device of Embodiment 1.

As illustrated in FIG. 7, the liquid crystal panel 100A includes a plurality of display units 72 for displaying an image by a soft veil-view function. The display units 72 are arranged to be adjacent to one another, and each include a pair of pixels constituted by a first pixel 70 selected from odd-numbered rows and a second pixel 71 selected from even-numbered rows. As illustrated in FIG. 1, each of the first pixel 70 and the second pixel 71 may be regarded as one pixel, or as illustrated in FIG. 8, a combination (pixel) of a first red pixel 70R, a first green pixel 70G, and a first blue pixel 70B may be regarded as the first pixel 70, and a combination (pixel) of a second red pixel 71R, a second green pixel 71G, and a second blue pixel 71B may be regarded as a second pixel 71. In the case of performing color display by an ordinary display method, pixels including red, green, and blue are individually driven independently of each other, thereby performing color display. In the case of performing normal color display, display can be performed with a resolution twice as high as a resolution in the case of performing color display by the soft veil-view function.

In the case of performing color display, the liquid crystal panel preferably includes a red display unit 72R including the first red pixel 70R and the second red pixel 71R, a green display unit 72G including the first green pixel 70G and the second green pixel 71G, and a blue display unit 72B including the first blue pixel 70B and the second blue pixel 71B. The color element 73 may include the red display unit 72R, the green display unit 72G, and the blue display unit 72B. Each of the first red pixel 70R and the second red pixel 71R overlaps the red color filter 32R in the optical aperture. Each of the first green pixel 70G and the second green pixel 71G overlaps the green color filter 32G in the optical aperture. Each of the first blue pixel 70B and the second blue pixel 71B overlaps the blue color filter 32B in the optical aperture.

As a method for displaying an image by the soft veil-view function, for example, assuming a data value of a luminance of a raw image to be displayed as the first image, Data1 is divided into two equal data values Data2 and Data3, and a data value of Data1+Data2 is input to one of the first pixel 70 and the second pixel 71, and a data value of Data1−Data3 is input to the other. In the case of observing the liquid crystal panel from a narrow viewing angle range, a luminance of the first pixel 70 and a luminance of the second pixel 71 are spatially averaged and the average is visually recognized as an image of a raw image, whereas in the case of observing the liquid crystal panel from a wide viewing angle range, a luminance of Data1+Data2 or a luminance of Data1−Data3 is visually recognized.

A display method in the case of displaying a veil-view pattern will now be described with reference to FIG. 9. In the first display mode, the control circuit 200 inputs different image signals to the first pixel and the second pixel such that a second image different from the first image is observed in the wide viewing angle range. This display method will also be referred to as a soft veil-view function. Display by the soft veil-view function can further enhance privacy protection by combination with the first display mode (privacy mode). Thus, in a case where the first display mode selection signal 214 is input from the display mode selection circuit 202, a veil-view pattern database 205 (hereinafter referred to as a database 205) preferably outputs a veil-view pattern image signal 220 to the image signal synthesis circuit 201.

As illustrated in FIG. 9, the control circuit 200 may further include the database 205 storing information on a veil-view pattern. When receiving a veil-view display switching signal 219, the database 205 outputs the veil-view pattern image signal 220 to the image signal synthesis circuit 201. The image signal synthesis circuit 201 outputs the image signal 212 obtained by synthesizing the raw image signal 211 and the veil-view pattern image signal 220, to the first electrode drive circuit 101 and the second electrode drive circuit 102.

For example, in a case where the second electrode drive circuit 102 applies a common voltage to the second electrode 14, the first electrode drive circuit 101 applies different voltages to the first electrodes 12 corresponding to the first pixel 70 and the second pixel 71 such that the second image is observed in a wide viewing angle range. In such a case, the first electrode 12 is preferably provided for each pixel. On the other hand, in a case where the first electrode drive circuit 101 applies a common voltage to the first electrode 12, the second electrode drive circuit 102 applies different voltages to the second electrodes 14 corresponding to the first pixel 70 and the second pixel 71 such that the second image is observed in a wide viewing angle range.

The second image preferably has a veil-view pattern. The veil-view pattern refers to a display image displayed while overlapping the first image and makes it difficult to visually recognize the first image. Displaying the veil-view pattern can further enhance privacy protection. The veil-view pattern is not limited, and a geometric pattern such as stripes or a checkerboard pattern, characters, and/or images, for example, can be displayed.

Embodiment 2

The features unique to the present embodiment are mainly described here, and description of the matters already described in Embodiment 1 is omitted.

Figure 10:
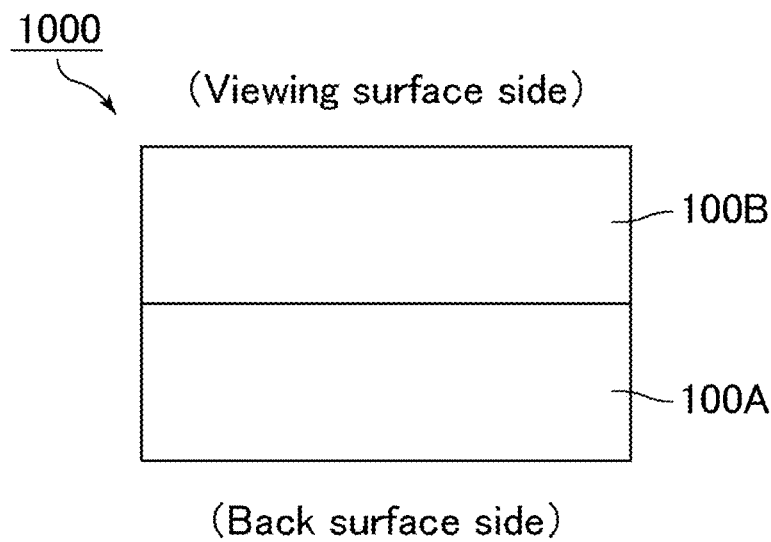
FIG. 10 is a schematic cross-sectional view of a liquid crystal display device of Embodiment 2.
Figure 11:
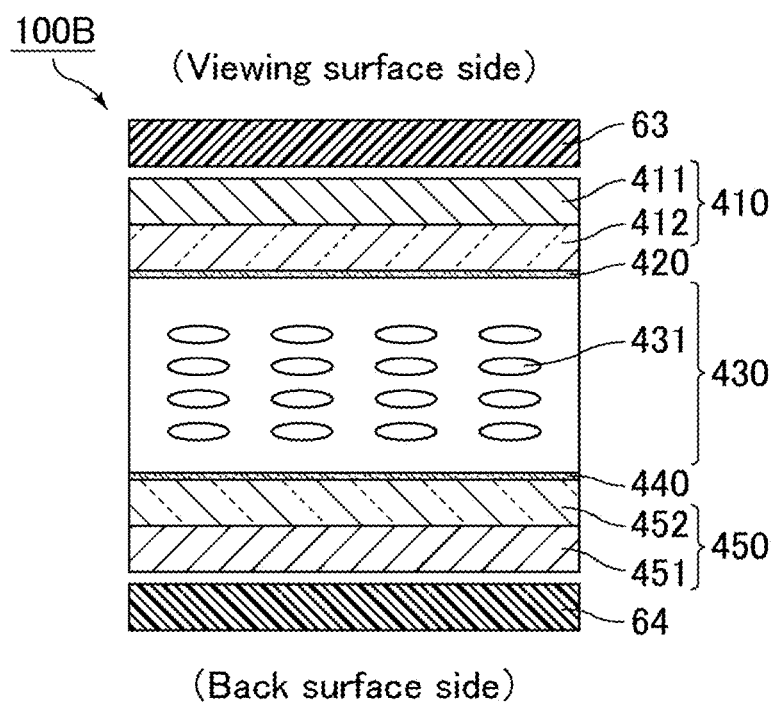
FIG. 11 is a schematic cross-sectional view illustrating a state of a second liquid crystal panel with no voltage applied in the liquid crystal display device of Embodiment 2.
Figure 12:
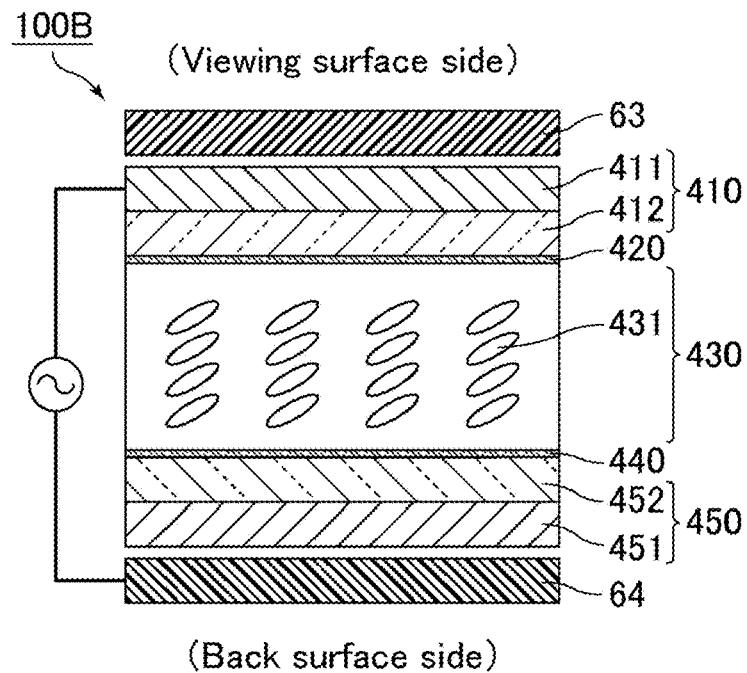
FIG. 12 is a schematic cross-sectional view illustrating a state of the second liquid crystal panel with voltage applied in the liquid crystal display device of Embodiment 2.
Figure 13:
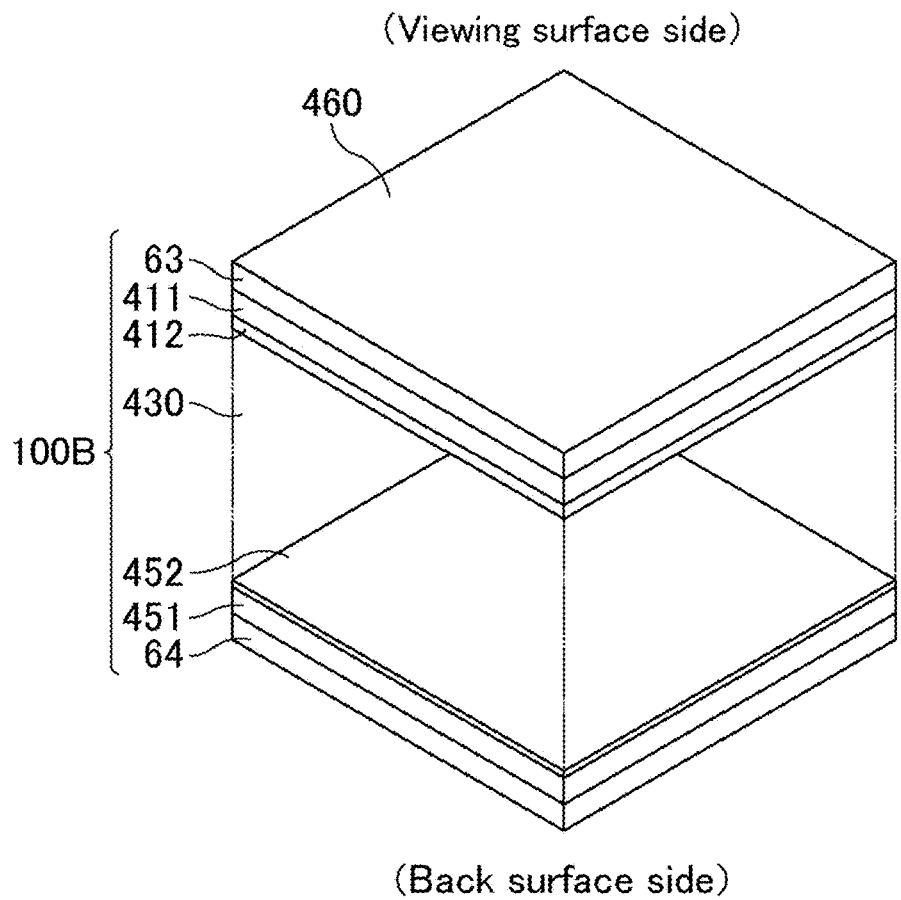
FIG. 13 is a schematic perspective view of the second liquid crystal panel of the liquid crystal display device of Embodiment 2.
Figure 14:
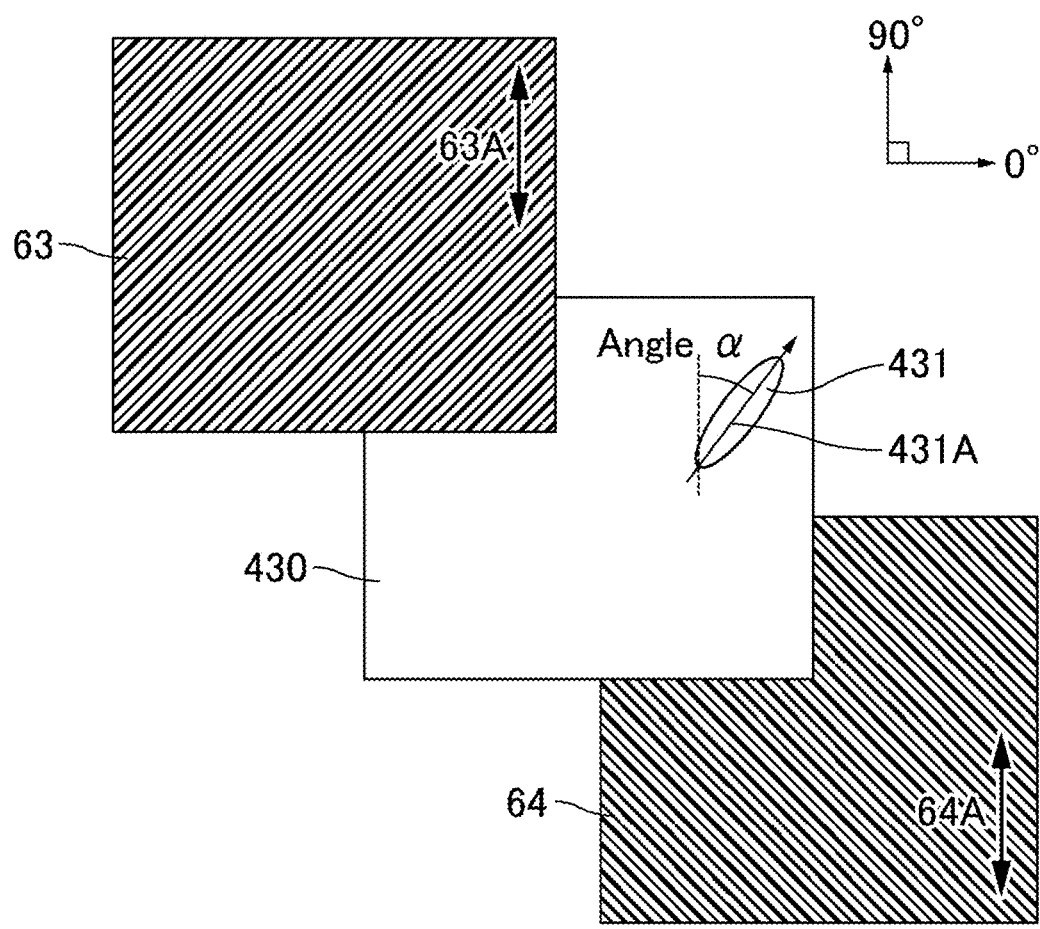
FIG. 14 is a schematic front view of the second liquid crystal panel of the liquid crystal display device of Embodiment 2.
Figure 15:
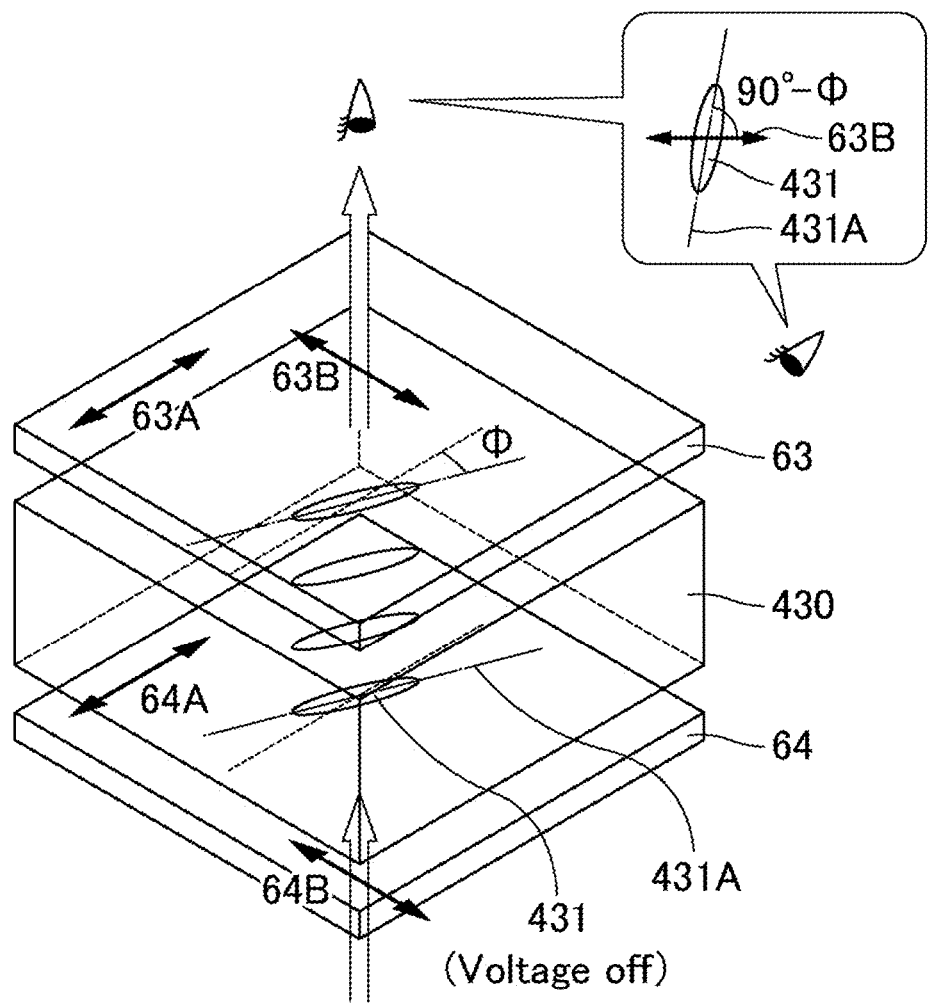
FIG. 15 is a schematic perspective view illustrating a relationship between a director of second liquid crystal molecules with no voltage applied and an absorption axis of each polarizing plate in the second liquid crystal panel of the liquid crystal display device of Embodiment 2.
Figure 16:
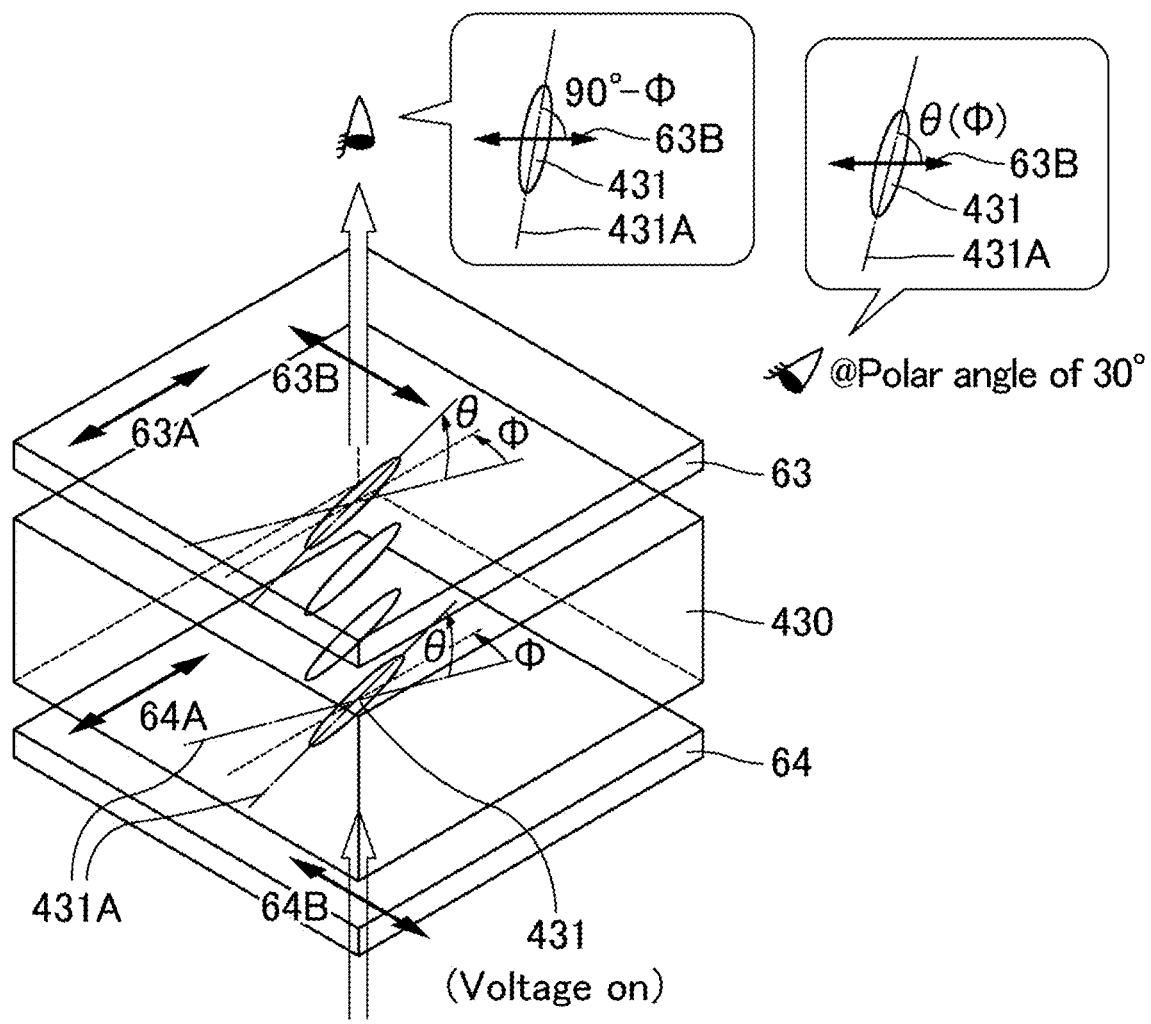
FIG. 16 is a schematic perspective view illustrating a relationship between the director of the second liquid crystal molecules with voltage applied and the absorption axis of each polarizing plate in the second liquid crystal panel of the liquid crystal display device of Embodiment 2.

FIG. 10 is a schematic cross-sectional view of a liquid crystal display device of Embodiment 2. FIG. 11 is a schematic cross-sectional view illustrating a state of a second liquid crystal panel with no voltage applied in the liquid crystal display device of Embodiment 2. FIG. 12 is a schematic cross-sectional view illustrating a state of a second liquid crystal panel with voltage applied in the liquid crystal display device of Embodiment 2. FIG. 13 is a schematic perspective view of the second liquid crystal panel of the liquid crystal display device of Embodiment 2. FIG. 14 is a schematic front view of the second liquid crystal panel of the liquid crystal display device of Embodiment 2. FIG. 15 is a schematic perspective view illustrating a relationship between a director of second liquid crystal molecules with no voltage applied and an absorption axis of each polarizing plate in the second liquid crystal panel of the liquid crystal display device of Embodiment 2. FIG. 16 is a schematic perspective view illustrating a relationship between the director of the second liquid crystal molecules with voltage applied and the absorption axis of each polarizing plate in the second liquid crystal panel of the liquid crystal display device of Embodiment 2.

The liquid crystal panel 100A of Embodiment 1 is a first liquid crystal panel 100A. As illustrated in FIG. 10, the liquid crystal display device 1000 of the present embodiment includes a first liquid crystal panel 100A, and a second liquid crystal panel 100B disposed at the viewing surface side or the back surface side of the first liquid crystal panel 100A. The second liquid crystal panel 100B is capable of switching between a privacy mode and a public mode, and has an asymmetric viewing angle in the privacy mode. With this configuration, since the liquid crystal display device 1000 includes the two liquid crystal panels (the first liquid crystal panel 100A and the second liquid crystal panel 100B) that can achieve an asymmetric viewing angle in the privacy mode, switching to the privacy mode can be independently performed in the leftward direction and the rightward direction. For example, one of the rightward direction and the leftward direction can be set at a low-contrast switching with the other set at a light-shielding switching.

The liquid crystal layer 20 of the first liquid crystal panel 100A is the first liquid crystal layer 20, and the liquid crystal molecules 21 are the first liquid crystal molecules 21.

As illustrated in FIG. 11 and FIG. 12, the second liquid crystal panel 100B of the present embodiment includes a third polarizing plate 63 having a third absorption axis, a first substrate 410 including a fifth electrode 412, a second liquid crystal layer 430 containing second liquid crystal molecules 431, and a second substrate 450 including a sixth electrode 452, in the stated order. In a plan view, an angle α formed by a director of the second liquid crystal molecules 431 with no voltage applied and the third absorption axis is 5° or more and 20° or less, or 65° or more and 80° or less. With this configuration, the second liquid crystal panel 100B with no voltage applied operates in a wide viewing angle mode while the second liquid crystal panel 100B with voltage applied operates in an asymmetric narrow viewing angle mode in which the viewing angle range is asymmetric about the central axis (polar angle of 0°, i.e., front) in a horizontal direction (at an azimuth of 0°-180°). Especially in the narrow viewing angle mode, the viewing angle can be narrowed down to a polar angle of 40°, for example, meaning that the light-shielding angle can be sufficiently small. The second liquid crystal panel 100B functions as a viewing angle-controlling liquid crystal panel.

The second liquid crystal panel 100B of the present embodiment is specifically in an electrically controlled birefringence (ECB) mode where in a plan view, the director of the second liquid crystal molecules 431 with no voltage applied and the third absorption axis form an angle α of 5° or more and 20° or less or 65° or more and 80° or less. This configuration achieves a bilaterally asymmetric luminance viewing angle relative to the front (polar angle of 0°) in the horizontal direction during voltage application to the ECB liquid crystal (second liquid crystal layer 430). For example, with an appropriately adjusted angle α, the polar angle at which the transmittance is minimum (such a polar angle is also referred to as a light-shielding angle) can be smaller. In other words, the second liquid crystal panel 100B of the present embodiment can further reduce the unviewable angle (polar angle) in the privacy mode (further narrow the viewable angle range (polar angle range) in the privacy mode).

In the ECB mode liquid crystal panel containing liquid crystal molecules having a positive anisotropy of dielectric constant, there is a trade-off relationship between the light-shielding angle and a retardation Re of the liquid crystal layer at an angle α of 0° or 90°. Specifically, when the liquid crystal layer provides a Re of 800 nm, the light-shielding angle at the optimum voltage is about 45 degrees. Meanwhile, in order to achieve a light-shielding angle of about 30°, Re needs to be about 1600 nm, meaning that the birefringence Δn or the cell thickness da of the liquid crystal layer has to be increased. For example, Δn needs to be 0.12 and da needs to be 13 μm when the cell thickness da is to be increased, while Δn needs to be 0.22 and da needs to be 7 μm when the birefringence Δn is to be increased. Increasing the cell thickness da and increasing the birefringence Δn, however, both raise issues of productivity and reliability. Specifically, increasing the cell thickness da involves issues of in-plane unevenness and yield (property stability) due to the increased thickness. Increasing the birefringence Δn leads to unstable operation at low temperature although it can achieve a high Δn when a tolane-based liquid crystal material is used. In contrast, the second liquid crystal panel 100B of the present embodiment eliminates the need for increasing the cell thickness da or birefringence Δn, and thus can achieve a sufficiently small light-shielding angle in the narrow viewing angle mode without a decline in productivity or reliability while preventing or reducing unstable operation at low temperature.

The second liquid crystal panel 100B of the present embodiment more specifically includes, as illustrated in FIG. 11 to FIG. 13, sequentially from the viewing surface side toward the back surface side, the third polarizing plate 63 having the third absorption axis, the first substrate 410 including the third support substrate 411 and the fifth electrode 412, the first alignment film 420, the second liquid crystal layer 430 containing the second liquid crystal molecules 431 having a positive anisotropy of dielectric constant, a second alignment film 440, the second substrate 450 including a fourth support substrate 451 and a sixth electrode 452, and a fourth polarizing plate 64 having a fourth absorption axis parallel to the third absorption axis. The second liquid crystal panel 100B of the present embodiment is in an ECB mode liquid crystal panel utilizing a nematic liquid crystal having a positive anisotropy of dielectric constant. The second liquid crystal panel 100B can change the voltage to be applied between the fifth electrode 412 and the sixth electrode 452 to change the retardation in the second liquid crystal layer 430, thus controlling transmission and blocking of light in the second liquid crystal layer 430.

The second liquid crystal panel 100B is a passive liquid crystal panel which is passively driven. Similar to a typical passive liquid crystal panel, the first substrate 410 of the second liquid crystal panel 100B includes the fifth electrode 412 as a solid electrode covering the entire surface of a screen 460, and the second substrate 450 includes the sixth electrode 452 as a solid electrode covering the entire surface of the screen 460. This configuration enables switching between the public mode and the privacy mode throughout the screen 460.

Examples of the third support substrate 411 and the fourth support substrate 451 include substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, and alicyclic polyolefin.

The fifth electrode 412 and the sixth electrode 452 may be transparent electrodes that can be formed from, for example, a transparent conductive material such as indium tin oxide (ITO), indium zinc oxide (IZO), zinc oxide (ZnO), or tin oxide (SnO) or an alloy of any of these materials.

The first alignment film 420 and the second alignment film 440 control the alignment azimuth of the second liquid crystal molecules 431 with no voltage applied and the tilt angle of the second liquid crystal molecules 431 with no voltage applied. The first alignment film 420 and the second alignment film 440 may be horizontal alignment films or vertical alignment films. In order to increase transmittance with no voltage applied, the first alignment film 420 and the second alignment film 440 are preferably horizontal alignment films.

A horizontal alignment film, when provided to a substrate in a liquid crystal display device, exerts an alignment control force of aligning the liquid crystal molecules in the liquid crystal layer substantially horizontally thereto, with no voltage applied to the liquid crystal layer. A vertical alignment film, when provided to a substrate in a liquid crystal display device, exerts an alignment control force of aligning the liquid crystal molecules in the liquid crystal layer substantially vertically thereto, with no voltage applied to the liquid crystal layer.

The expression "substantially horizontally" means that the tilt angle is 0° or more and 10° or less, preferably 0° or more and 5° or less, more preferably 0° or more and 2° or less. The expression "substantially vertically" means that the tilt angle is 83° or more and 90° or less, preferably 85° or more and 90° or less, more preferably 87.5° or more and 88.0° or less.

The "tilt angle" herein does not mean the angle formed by the director of liquid crystal molecules and the main surface of each substrate, but means the average angle formed by the director of liquid crystal molecules in the thickness direction of the liquid crystal layer and the main surface of each substrate (each of the first substrate and the second substrate), with the angle parallel to the substrate surface measuring 0° and the angle of the line normal to the substrate surface measuring 90°. In particular, the tilt angle of the liquid crystal molecules with no voltage applied is also referred to as a pre-tilt angle. The alignment azimuth of liquid crystal molecules with no voltage applied is also referred to as an initial alignment azimuth. The tilt angle can be measured by the rotating crystal method with, for example, Axoscan (available from Axometrics, Inc.). The director of liquid crystal molecules in the present embodiment means the direction of the principal axes of alignment (the average direction of the long axes of molecules in nematic liquid crystal). For example, in a plan view, the director of liquid crystal molecules with no voltage applied matches the alignment treatment direction for the alignment films.

The first alignment film 420 and the second alignment film 440 can be made of a material commonly used in the field of liquid crystal panels, such as a polymer having a polyimide structure in its main chain, a polymer having a polyamic acid structure in its main chain, or a polymer having a polysiloxane structure in its main chain. The first alignment film 420 and the second alignment film 440 can be formed by, for example, applying an alignment film material to a substrate. The application method may be any method such as flexo printing or inkjet coating.

The first alignment film 420 and the second alignment film 440 may be a photoalignment film containing a photofunctional group and having undergone a photoalignment treatment as the alignment treatment, a rubbed alignment film having undergone a rubbing treatment as the alignment treatment, or an alignment film having undergone no alignment treatment.

The second liquid crystal layer 430 contains the second liquid crystal molecules 431. The amount of light transmission is controlled by changing the alignment of the second liquid crystal molecules 431 based on the voltage applied to the second liquid crystal layer 430. The anisotropy of dielectric constant ($\Delta\varepsilon$) of the second liquid crystal molecules 431 is defined by the above formula (L). Preferably, the second liquid crystal molecules 431 have a positive anisotropy of dielectric constant. This configuration can reduce the driving voltage. The configuration also can make the liquid crystal panel resistant to the external thermal environment (highly reliable).

The second liquid crystal molecules 431 are homogeneously aligned with no voltage applied. Herein, the homogeneous alignment means an alignment state where the liquid crystal molecules are aligned horizontally to the surfaces of a substrate constituting the second liquid crystal panel 100B (e.g., the surfaces of at least one of the first substrate 410 or the second substrate 450) and the orientations of the liquid crystal molecules are the same. The state with no voltage applied (during no voltage application) means a state where voltage of the threshold or more for the liquid crystal molecules is not applied to the liquid crystal layer. For example, the same constant voltage may be applied to the fifth electrode 412 and the sixth electrode 452, or a constant voltage may be applied to one of the fifth electrode 412 and the sixth electrode 452 while a voltage lower than the threshold for the liquid crystal molecules relative to the constant voltage may be applied to the other of the electrodes. The state with voltage applied (during voltage application) means a state where a voltage of the threshold or more for the liquid crystal molecules is applied to the liquid crystal layer.

As illustrated in FIG. 14, in a plan view, when a director 431A of the second liquid crystal molecules 431 with no voltage applied and a third absorption axis 63A of the third polarizing plate 63 form an angle $\alpha$ of $\varphi$ (here, $\alpha$ is 5° or more and 20° or less or 65° or more and 80° or less), the angle formed by the director 431A of the second liquid crystal molecules 431 with no voltage applied and a third transmission axis 63B of the third polarizing plate 63 satisfies 90°−$\varphi$ in observation of the screen both at a polar angle of 0° (front direction) and at a larger polar angle as shown in FIG. 15.

Meanwhile, with voltage applied, as illustrated in FIG. 16, the angle formed by the director 431A of the second liquid crystal molecules 431 and the third transmission axis 63B of the third polarizing plate 63 satisfies 90°−$\varphi$ in observation of the screen at a polar angle of 0° (front direction). However, in observation of the screen at a larger polar angle (e.g., polar angle of 30°), the angle formed by the director 431A of the second liquid crystal molecules 431 and the third transmission axis 63B of the third polarizing plate 63 depends on the tilt angle $\theta$ of the second liquid crystal molecules 431 and the angle $\varphi$, and thus is different from the angle in observation from the front direction.

In this manner, in the present embodiment, in a plan view, when the director 431A of the second liquid crystal molecules 431 with no voltage applied and the third absorption axis 63A of the third polarizing plate 63 form an angle $\alpha$ of 5° or more and 20° or less or 65° or more and 80° or less, the second liquid crystal panel 100B with voltage applied operates in the narrow viewing angle mode in which the viewing angle range is asymmetric about the central axis (polar angle of 0°, i.e., front direction) in the horizontal direction (an azimuth of 0°-180°). In particular, in this narrow viewing angle mode, the viewing angle can be narrowed down to a polar angle of 40° or less, for example, meaning that the light-shielding angle can be sufficiently small.

Application of the liquid crystal display device 1000 of the present embodiment to, for example, a laptop PC enables switching to a privacy mode in which display contents are shared only by left and center persons while not shared by a right person, and can achieve switching with a higher level of flexibility. Although FIG. 10 shows a configuration in which the second liquid crystal panel 100B is disposed on the viewing surface side of the first liquid crystal panel 100A, the same effect can be achieved in a case where the second liquid crystal panel 100B is disposed on the back surface side of the first liquid crystal panel 100A.

Preferably, the tilt angle of the second liquid crystal molecules 431 with no voltage applied is 1° or more and 5° or less, while the tilt angle of the second liquid crystal molecules 431 with voltage applied is 40° or more and 75° or less. This configuration can further reduce the unviewable angle (polar angle) in the privacy mode. In other words, the configuration enables blocking of light at smaller polar angles. Herein, with the direction perpendicular to the display surface of the liquid crystal panel taken as the reference, the polar angle decreases as it goes closer to the perpendicular direction, while the polar angle increases as it goes farther from the perpendicular direction.

The birefringence Δn of the second liquid crystal molecules 431 may be 0.08 or more and 0.24 or less. For a high degree of reliability (high voltage holding ratio, wide operation temperature range), the birefringence Δn is preferably 0.08 or more and 0.16 or less.

The thickness (cell thickness) da of the second liquid crystal layer 430 is preferably 3 μm or more and 10 μm or less. This configuration can increase the response speed of the second liquid crystal molecules 431. Also, the thickness of the second liquid crystal panel 100B can be further reduced. In terms of reduction of thickness, the thickness da of the second liquid crystal layer 430 is more preferably 3 μm or more and 5 μm or less. In terms of the yield, the thickness da of the second liquid crystal layer 430 is more preferably 5 μm or more and 10 μm or less. The second liquid crystal layer 430 having a thickness da of 5 μm or more can cause the display unevenness due to contamination with a foreign material to be less noticeable, thus increasing the yield.

Preferably, the second liquid crystal layer 430 with voltage applied provides a retardation Re of 600 nm or more and 1000 nm or less. This configuration can reliably achieve a sufficient light-shielding ability and sufficient production stability. The retardation Re provided by the second liquid crystal layer 430 is expressed as the product of the birefringence (Δn) of the liquid crystal molecules and the thickness (da) of the liquid crystal layer.

The third polarizing plate 63 and the fourth polarizing plate 64 are both absorptive polarizers. The third polarizing plate 63 and the fourth polarizing plate 64 may be, for example, a polarizer (absorptive polarizing plate) obtained by dyeing a polyvinyl alcohol (PVA) film with an anisotropic material such as an iodine complex (or dye) to adsorb the anisotropic material on the PVA film, and stretching the film for alignment.

The third polarizing plate 63 has a third absorption axis 63A and a third transmission axis 63B perpendicular to the third absorption axis 63A. The fourth polarizing plate 64 has a fourth absorption axis 64A and a fourth transmission axis 64B perpendicular to the fourth absorption axis 64A.

The fourth absorption axis 64A is preferably parallel to the third absorption axis 63A. For example, the third absorption axis 63A and the fourth absorption axis 64A are set at an axis azimuth of 90°.

Embodiment 3

The features unique to the present embodiment are mainly described here, and description of the matters already described in Embodiment 1 and Embodiment 2 is omitted.

Figure 17:
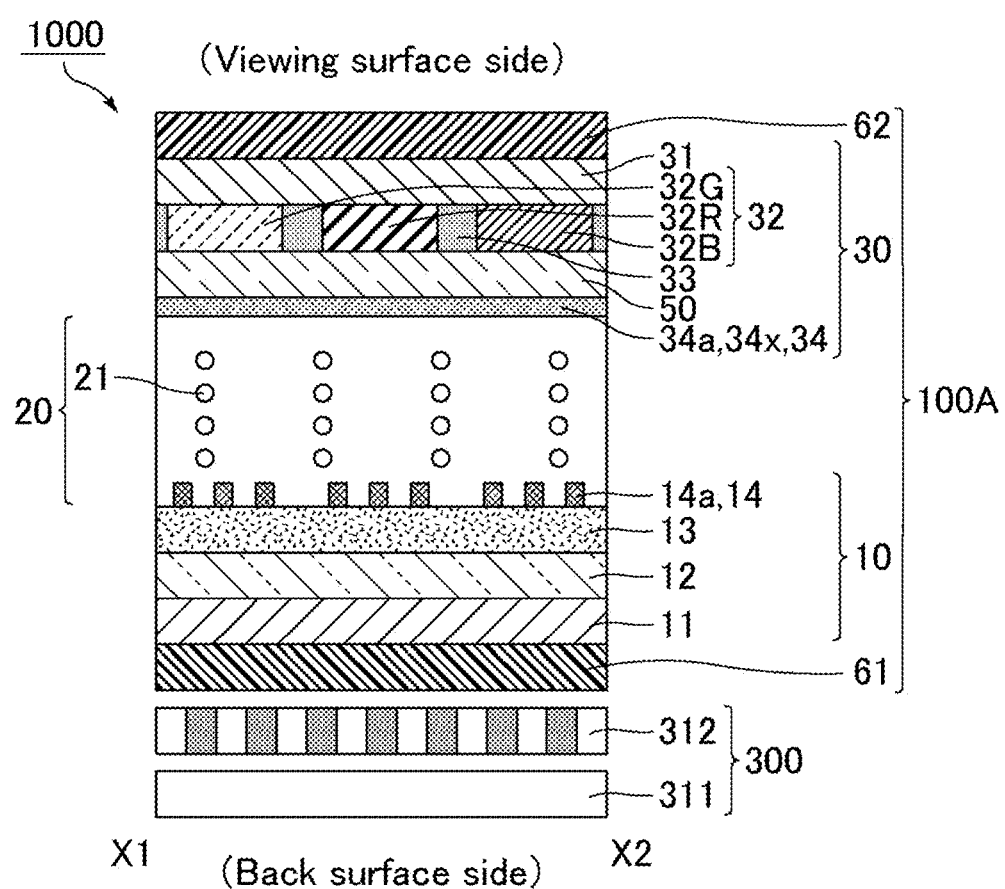
FIG. 17 is a schematic cross-sectional view of a liquid crystal display device of Embodiment 3.
Figure 18:
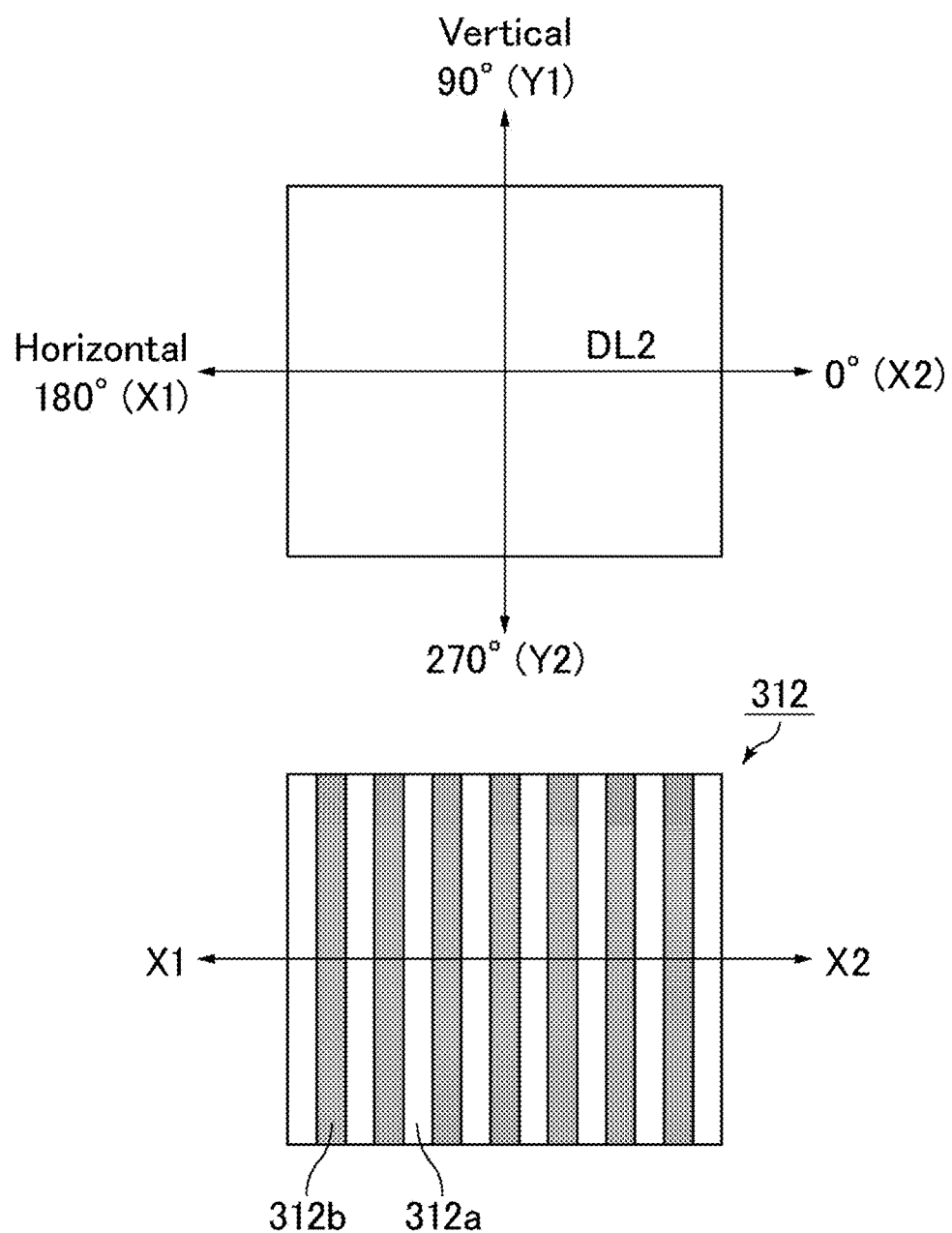
FIG. 18 is a schematic plan view of a light-shielding louver of the liquid crystal display device of Embodiment 3.
Figure 19:
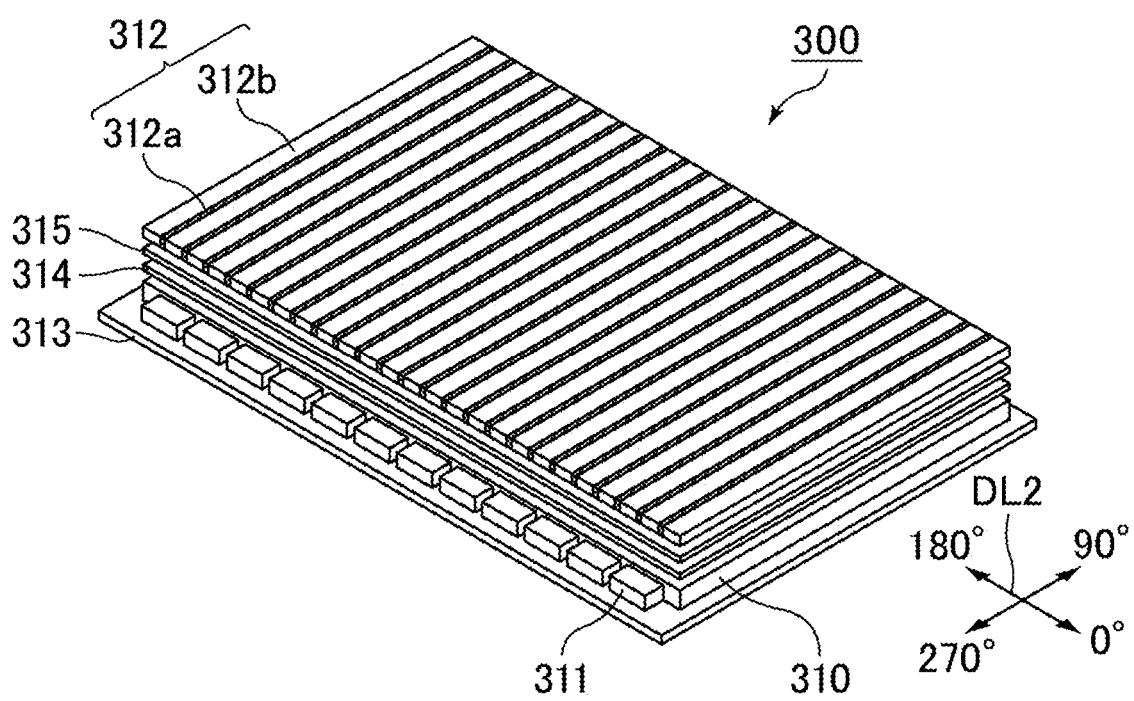
FIG. 19 is a disassembled perspective view schematically illustrating a backlight of the liquid crystal display device of Embodiment 3.

FIG. 17 is a schematic cross-sectional view of a liquid crystal display device of Embodiment 3. FIG. 18 is a schematic plan view of a light-shielding louver of the liquid crystal display device of Embodiment 3. FIG. 19 is a disassembled perspective view schematically illustrating a backlight of the liquid crystal display device of Embodiment 3.

As illustrated in FIG. 17, the liquid crystal display device 1000 of the present embodiment includes a backlight 300 at a back surface of the liquid crystal panel 100A. The backlight 300 includes a light source 311 and a light-shielding louver 312 disposed closer to the liquid crystal panel 100A than the light source 311 is. This configuration can relatively increase a luminance in the normal direction, and directivity of the backlight 300. The backlight 300 including the light-shielding louver 312 can be a known backlight and may be, for example, the backlight disclosed in JP 2002-124112 A.

As illustrated in FIG. 18, the light-shielding louver 312 includes a linear light-absorbing layer 312b, and in a plan view, a direction in which the light-absorbing layer 312b extends and the second direction DL2 are preferably perpendicular to each other. With this configuration, when the angle is tilted to an azimuth of 0°-180°, that is, at a higher polar angle side at an azimuth of 0°-180°, the light-absorbing layer 312b can block incident light, leading to enhanced privacy protection.

As illustrated in FIG. 19, the backlight 300 including the light-shielding louver 312 may be an edge-lit backlight, and as illustrated in FIG. 19, for example, may include a light guide plate 310 and light sources 311 disposed on a side surface of the light guide plate 310, and may also include a light-shielding louver 312 at the front surface side (liquid crystal panel side) of the light guide plate 310. A reflective sheet 313 may be disposed at the back surface of the light guide plate 310, and a prism sheet 314, a diffusing sheet 315, and other members may be disposed between the light guide plate 310 and the light-shielding louver 312. The light sources 311 only need to be disposed at least one of opposing side surfaces of the light guide plate 310, and may be disposed on each side surface thereof. Although FIG. 19 shows an example in which the light sources 311 are disposed along an azimuth of 0°-180° of the liquid crystal panel, the light source 311 may be disposed along an azimuth of 90°-270° of the liquid crystal panel.

The light-shielding louver 312 preferably blocks light emitted from the light guide plate 310, in accordance with an incident angle. Examples of the light-shielding louver 312 include a louver as disclosed in JP 2002-124112 A in which light transmission layers 312a that transmit light and light-absorbing layers 312b that absorb light are alternately arranged in a specific cycle. The cycle of arrangement of the light transmission layers 312a and the light-absorbing layers 312b may be, for example, 100 μm to 150 μm. The light transmission layers 312a and the light-absorbing layers 312b may be linearly arranged in a plan view, and the directions in each of which the light transmission layer 312a or the light-absorbing layer 312b extends preferably form an angle of 0 to 10° with respect to an azimuth of 90°-270° of the liquid crystal panel, and may be parallel to an azimuth of 90°-270° (angle formed is 0°).

The light transmission layers 312a may be made of a resin having light transmittance, for example, and the light-absorbing layers 312b may be made of a resin including a black pigment or a black dye. The light-absorbing layer 312b preferably has a total light transmittance of 5% or less, and the light transmission layer 312a preferably has a total light transmittance of 80% or more.

Figure 20:
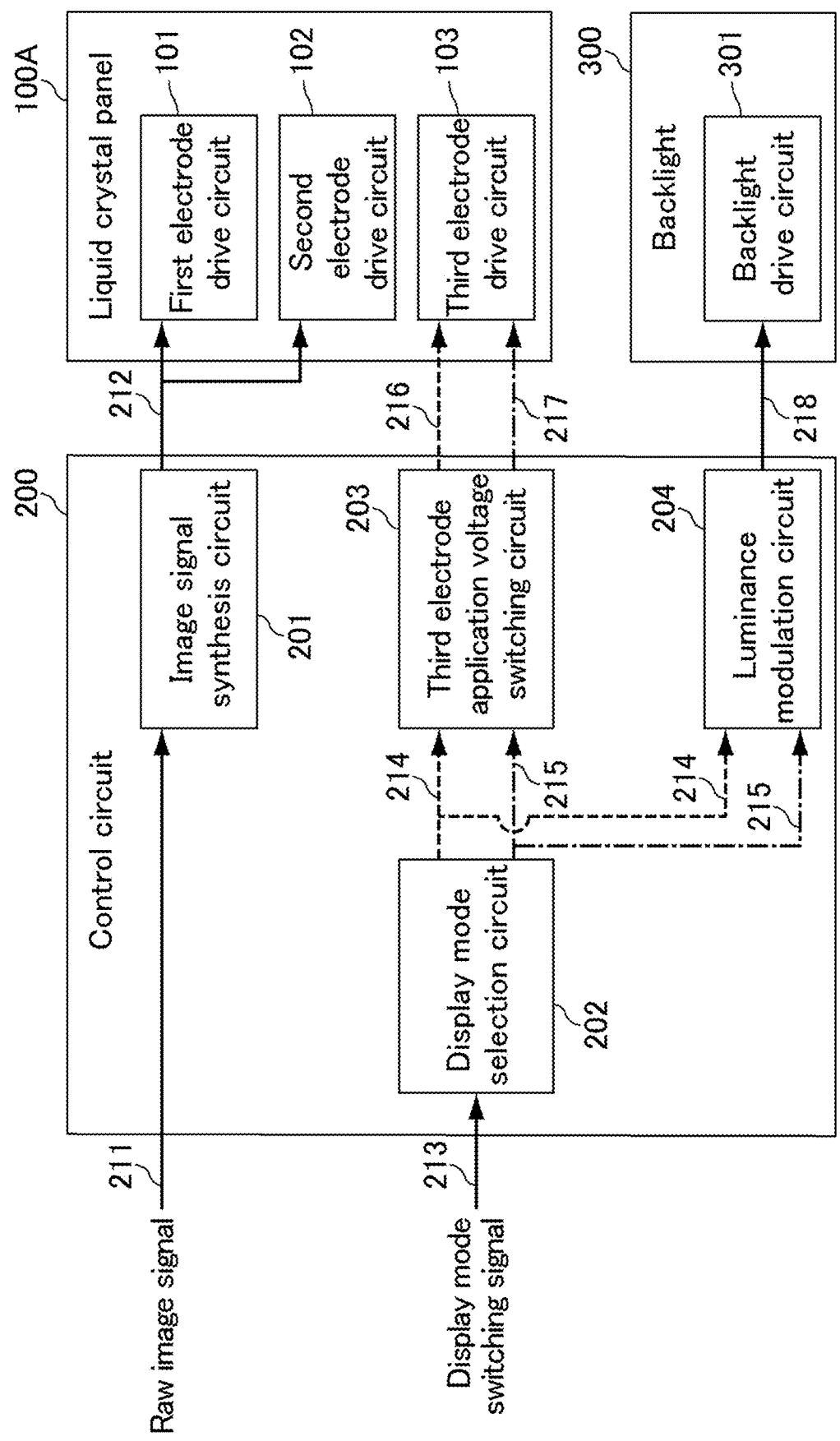
FIG. 20 is a block diagram schematically illustrating display methods in a first display mode and a second display mode of the liquid crystal display device of Embodiment 3.
Figure 21:
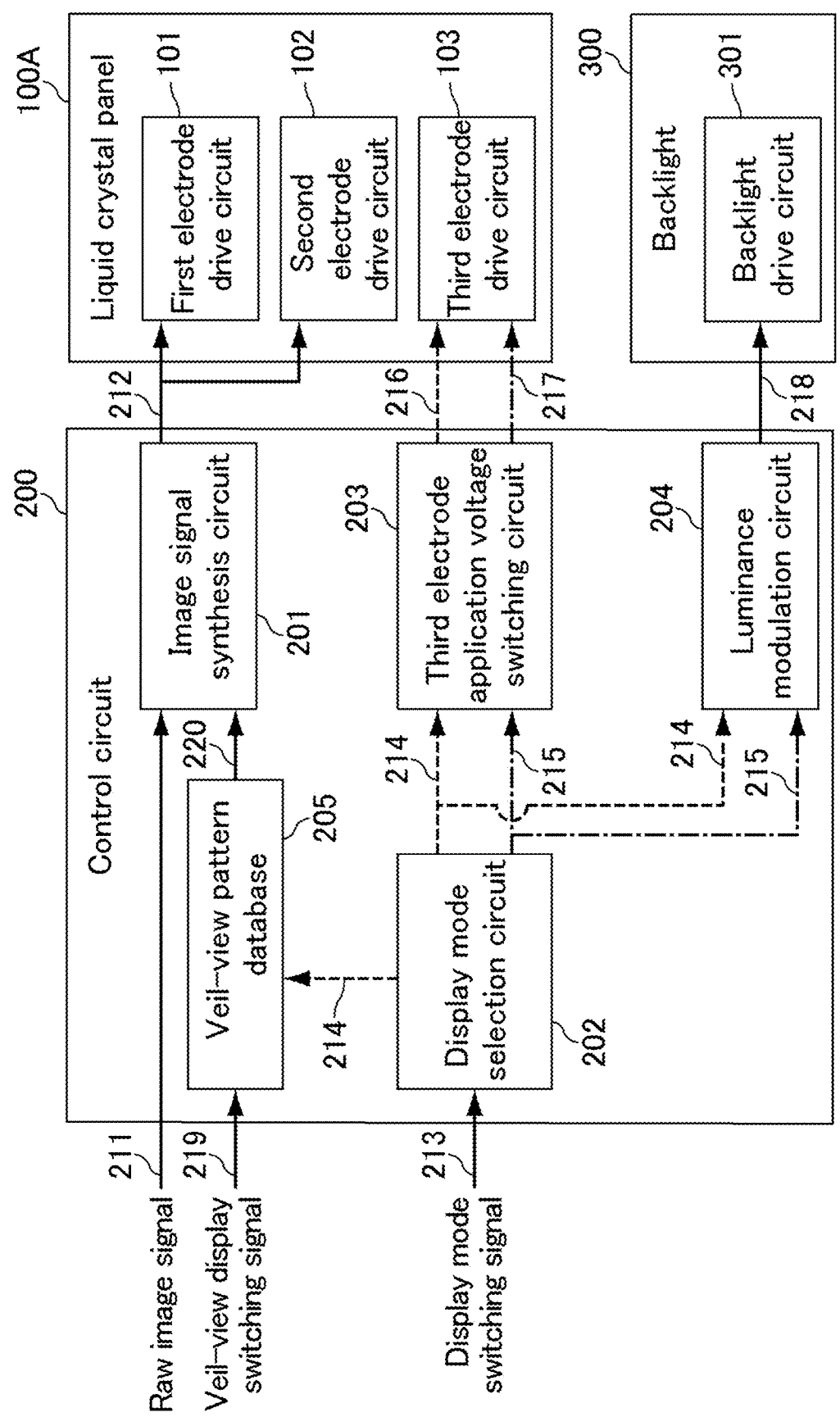
FIG. 21 is a block diagram schematically illustrating a display method in the case of displaying a veil-view pattern in the liquid crystal display device of Embodiment 3.

In the liquid crystal display device 1000 of the present embodiment, when the luminance of the backlight 300 is incorporated with the display mode, privacy protection in the privacy mode can be more effectively enhanced. FIG. 20 is a block diagram schematically illustrating display methods in a first display mode and a second display mode of the liquid crystal display device of Embodiment 3. FIG. 21 is a block diagram schematically illustrating a display method in the case of displaying a veil-view pattern in the liquid crystal display device of Embodiment 3.

The control circuit 200 performs control such that the luminance of the backlight 300 in the first display mode is lower than the backlight 300 in the second display mode. As illustrated in FIG. 20 and FIG. 21, the control circuit 200 may further include a luminance modulation circuit 204 for the backlight. The backlight 300 may include a backlight drive circuit 301.

When receiving the first display mode selection signal 214 from the display mode selection circuit 202, the luminance modulation circuit 204 outputs a luminance modulation signal 218 to the backlight drive circuit 301 so that luminance of the backlight 300 is adjusted to decrease. When receiving the second display mode selection signal 215 from the display mode selection circuit 202, the luminance modulation circuit 204 outputs the luminance modulation signal 218 to the backlight drive circuit 301 so that the luminance of the backlight 300 is adjusted to increase.

The luminance of the backlight 300 may be adjusted such that a luminance of the liquid crystal panel in white display when observed in the normal direction is 100 to 300 nit in the first display mode, and 300 to 500 nit in the second display mode.

EXAMPLES

Hereinafter, the effects of the present invention are described with reference to examples. The present invention is not limited to these examples.

Example 1

Example 1 is a specific example of Embodiment 1. A schematic plan view thereof is similar to FIG. 1 and FIG. 2, and a schematic cross-sectional view thereof is similar to FIG. 5. The active matrix substrate 10 had an FFS electrode structure, and the first electrode 12 was a solid electrode having no apertures. The second electrode 14 was disposed at each pixel and had an electrode structure including three first linear electrode portions 14a each with a width of 2.5 µm and having apertures 14b each with a width of 3.5 µm and located between the first linear electrode portions 14a. Liquid crystal molecules were positive liquid crystal molecules.

With respect to the counter substrate 30, the color filters had a thickness of 2.3 µm, the first dielectric layer 50 had a thickness of 2 µm, and the second dielectric layer 51 had a thickness of 2 µm. The second linear electrode portions 34x included a plurality of second linear electrode portions 34a overlapping optical apertures and a plurality of second linear electrode portions 34b overlapping the black matrix. More specifically, the number of the second linear electrode portions 34a overlapping the optical aperture of one pixel 70A was two. A distance between the second linear electrode portions 34x was 5 µm. More specifically, a distance between each second linear electrode portion 34a overlapping the optical aperture and a second linear electrode portion 34b overlapping the black matrix was 11.5 µm, and a distance between the second linear electrode portions 34a overlapping the optical apertures was 5 µm. Each second linear electrode portion 34a overlapping the optical aperture had a width W34a of 5 µm. Each second linear electrode portion 34b overlapping the black matrix had a width W34b of 31 µm.

A direction in which the first linear electrode portions 14a extend (first direction DL1) and a direction in which the second linear electrode portions 34x of the third electrode 34 extend (second direction DL2) formed an angle θ1 of 80°. As to dimensions of one pixel 70A, a lateral width (width gx) along the second direction DL2 was 14.68 µm, and a longitudinal width (width gy) along a direction perpendicular to the second direction DL2 was 50 µm.

In a plan view, the island-shaped electrode portions 35a were disposed between the second linear electrode portions 34x, more specifically, between a second linear electrode portion 34a overlapping the optical aperture and a second linear electrode portion 34b overlapping the black matrix and between the second linear electrode portions 34a overlapping the optical apertures, and three island-shaped electrode portions 35a were disposed for one pixel 70A.

Each island-shaped electrode portion 35a had an electrode width W35a1 of 5 µm. A distance between adjacent island-shaped electrode portions 35a was 5 µm. A distance d between an island-shaped electrode portion 35a and the second linear electrode portion 34x adjacent to this island-shaped electrode portions 35a was 3 µm. More specifically, a distance d1 between an island-shaped electrode portion 35a and the second linear electrode portion 34a overlapping the optical aperture and adjacent to this island-shaped electrode portion 35a was 3 µm, and a distance d2 between an island-shaped electrode portion 35a and the second linear electrode portion 34b overlapping the black matrix and adjacent to this island-shaped electrode portion 35a was 3 µm. Each island-shaped electrode portion 35a had a length f of 5 µm.

As the first electrode 12, the second electrode 14, the third electrode 34, and the fourth electrode 35, ITOs can be used. For example, silicon oxide can be used as the first insulating layer 13, and an acrylic resin can be used as the first dielectric layer 50. The black matrix can be a matrix made of a black resin and having a specific resistance of $1.0 \times 10^{10}$ to $1.0 \times 10^{13}$ (Ω·cm).

In liquid crystal panel 100A of Example 1, the electrodes in a floating dot pattern (island-shaped electrode portions 35a) between electrodes forming transverse stripes (second linear electrode portions 34x) extended out from an end portion of the black matrix 33 to the optical aperture 1000A of one pixel 70A1 of the two pixels 70A1 and 70A2 adjacent to each other along the second direction DL2. The liquid crystal display device 1000 of Example 1 satisfied Formula (1), Formula (1-1), Formula (1-2), and Formula (2) described above.

For the liquid crystal display device 1000 of Example 1, contrast ratios at an azimuth of −45° to +45° in the case of white display in the public mode and the privacy mode were simulated. The simulation of contrast ratios was obtained from a simulation of contrast ratios in the case of observing the liquid crystal panel at an azimuth of −45° to +45° with a LCD master 3D (available from SHINTECH). An azimuth with a high contrast ratio is considered favorable in visibility. The contrast ratio (CR) is expressed by Formula (CR1).

$CR$=luminance in white display(grayscale value of 255)/luminance in black display(grayscale value of 0)  Formula (CR1)

In the following description, the value of the AC voltage applied to the first electrode and the second electrode and the value of the driving voltage applied to the third electrode are values in a case where a constant voltage applied to the third electrode in the public mode is a common voltage (0 V).

In the public mode, a constant voltage (common voltage) was applied to the third electrode in Example 1. As the constant voltage, a fixed voltage of 0 V was applied. For the privacy mode, simulation was performed on a case where an AC voltage of 2.4 V relative to the constant voltage was applied to the third electrode in Example 1. In both the public mode and the privacy mode, a common voltage (0 V) was applied to the first electrode 12 and an AC voltage of 6.5 V relative to the constant voltage was applied to the second electrode 14, so that white display was provided. The frequency of the third electrode was 120 Hz, and the frequency of the second electrode 14 was 60 Hz.

Figure 22:
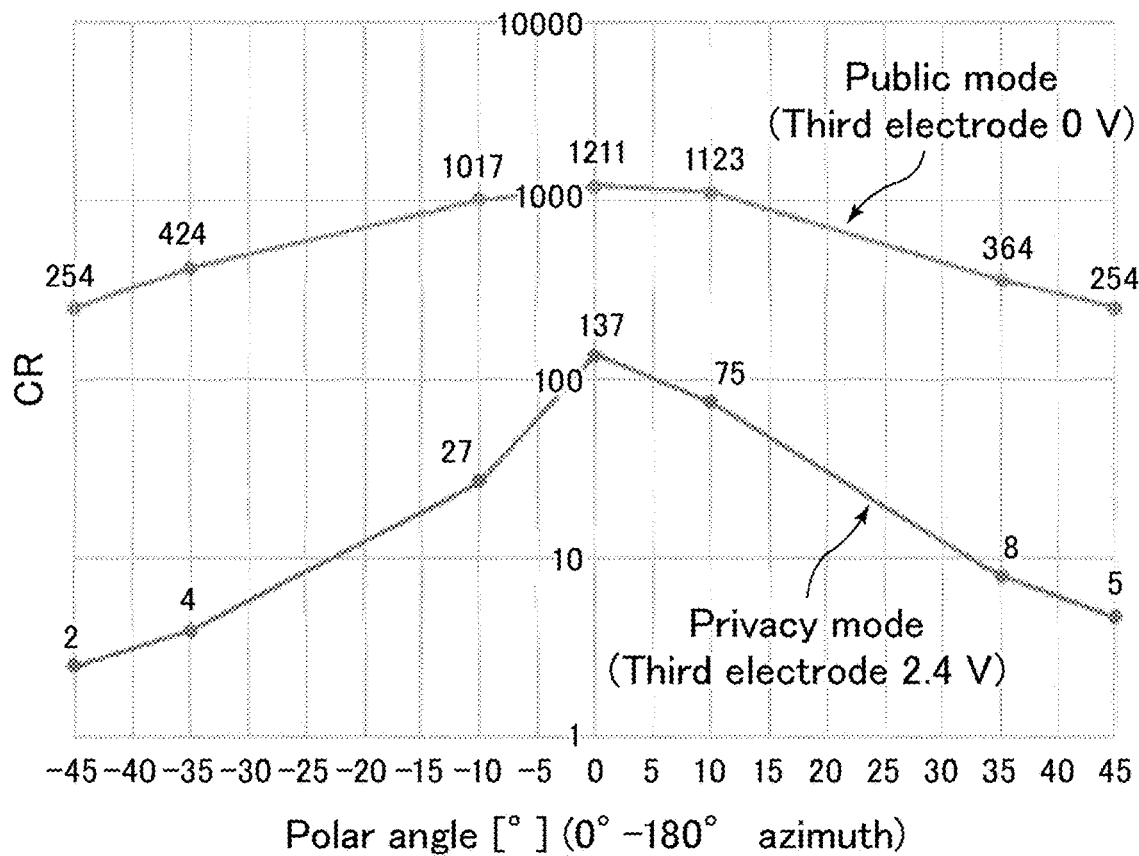
FIG. 22 is a graph showing contrast ratio versus polar angle in a liquid crystal display device of Example 1.

FIG. 22 is a graph showing contrast ratio versus polar angle in the liquid crystal display device of Example 1. FIG. 22 shows measured data of the liquid crystal display device of Example 1. When the voltage applied to the third electrode 34 was 0 V, the liquid crystal display device 1000 of Example 1 operated as a bilateral public mode (CR (contrast ratio) at a polar angle of ±45° was 254), as illustrated in FIG. 22. On the other hand, when a voltage of 2.4 V was applied to the third electrode, CR was 2 at a polar angle of −45° in the leftward direction, whereas CR was 5 at a polar angle of 45° in the rightward direction, meaning that the privacy mode having an asymmetric CR was achieved.

Figure 23:
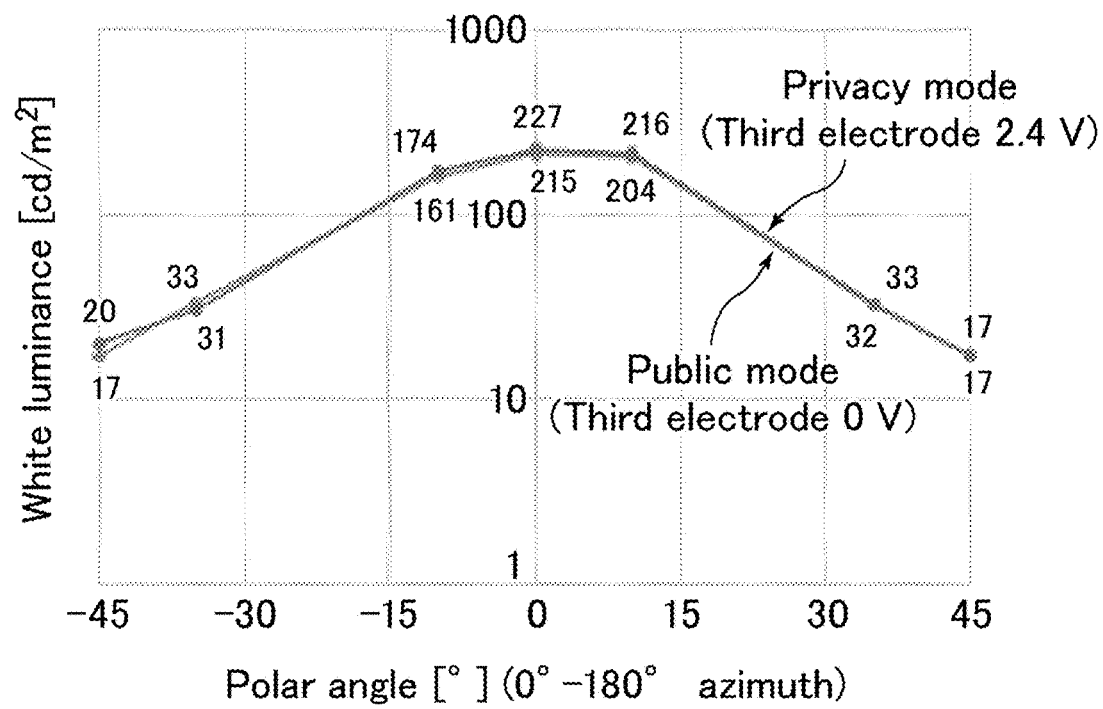
FIG. 23 is a graph showing a viewing angle in white display of the liquid crystal display device of Example 1.
Figure 24:
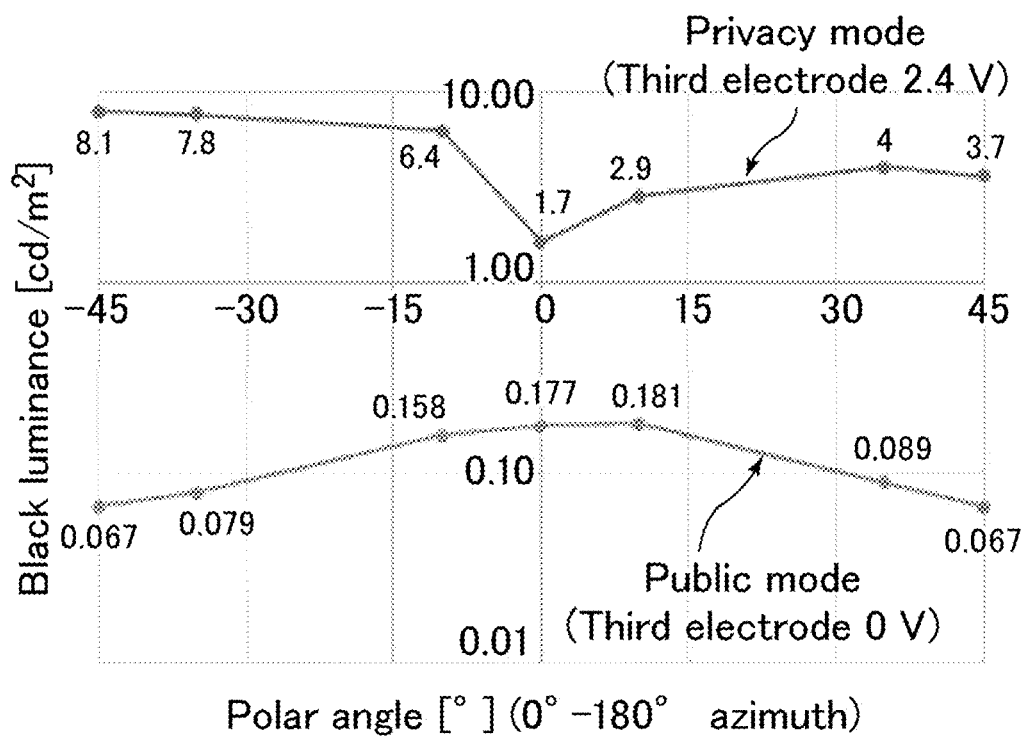
FIG. 24 is a graph showing a viewing angle in black display of the liquid crystal display device of Example 1.

FIG. 23 is a graph showing a viewing angle in white display of the liquid crystal display device of Example 1. FIG. 24 is a graph showing a viewing angle in black display of the liquid crystal display device of Example 1. FIG. 23 and FIG. 24 show measured data of the liquid crystal display device of Example 1. Considering the contrast ratio viewing angle in the public mode and the privacy mode illustrated in FIG. 22 in view of FIG. 23 and FIG. 24, not white luminance but asymmetry of black luminance (3.7 cd/m$^2$ at a polar angle of +45°, 8.1 cd/m$^2$ at a polar angle of −45°) was a cause. That is, liquid crystal molecules tend to rise toward the side of the fourth electrode 35 including electrodes in a dot pattern (island-shaped electrode portions 35*a*) at a lower potential than the third electrode including electrodes forming transverse stripes (second linear electrode portions 34*x*). Thus, the amount of light leakage in black display is larger at the − polar angle side than at the + polar angle side. Accordingly, CR viewing angle is asymmetric.

Figure 25:
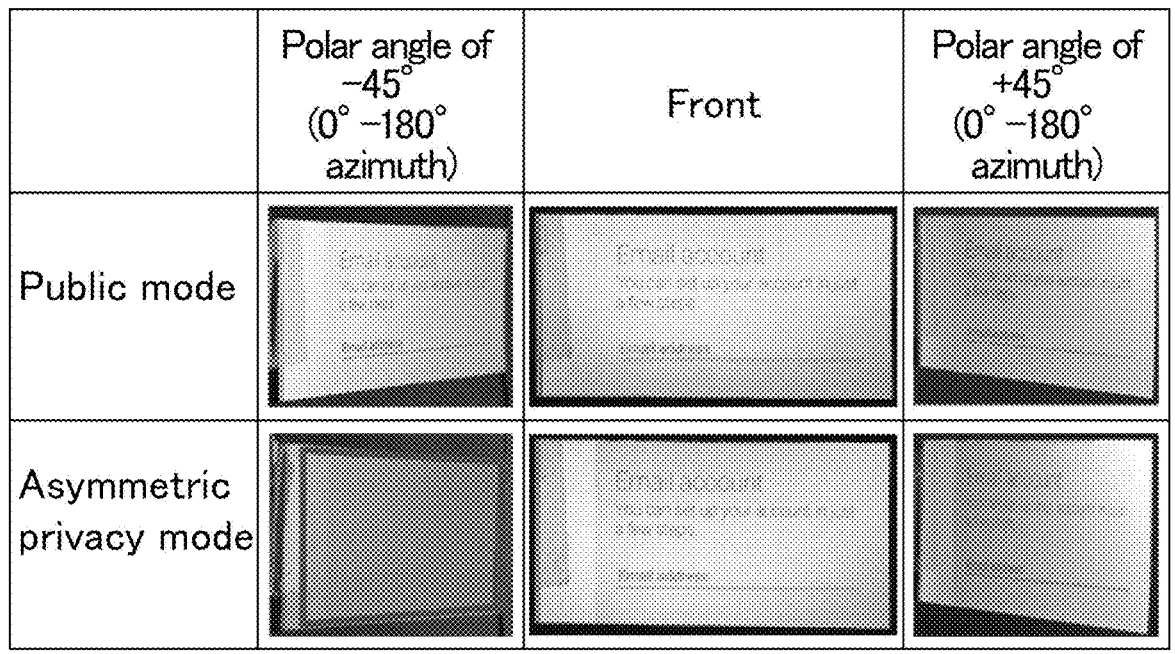
FIG. 25 shows photographs of the appearance in a public mode and a privacy mode of the liquid crystal display device of Example 1.

FIG. 25 is a photograph of appearance in a public mode and a privacy mode of the liquid crystal display device of Example 1. As illustrated in FIG. 25, in the public mode, contents were visually recognized at a polar angle of ±45°. In the privacy mode, CR was 2 and no contents were visually recognized at a polar angle of −45° in the leftward direction, whereas CR was 5 and contents were visually recognized at a polar angle of +45° in the rightward direction.

Since the liquid crystal panel 100A of Example 1 was in an FFS mode, a public mode having wide viewing angle characteristics was achieved. In addition, with application of voltage to the electrodes forming transverse stripes (second linear electrode portions 34*x*) of the counter substrate 30, a privacy mode having an asymmetric viewing angle was achieved.

Examples 2 to 4

Figure 26:
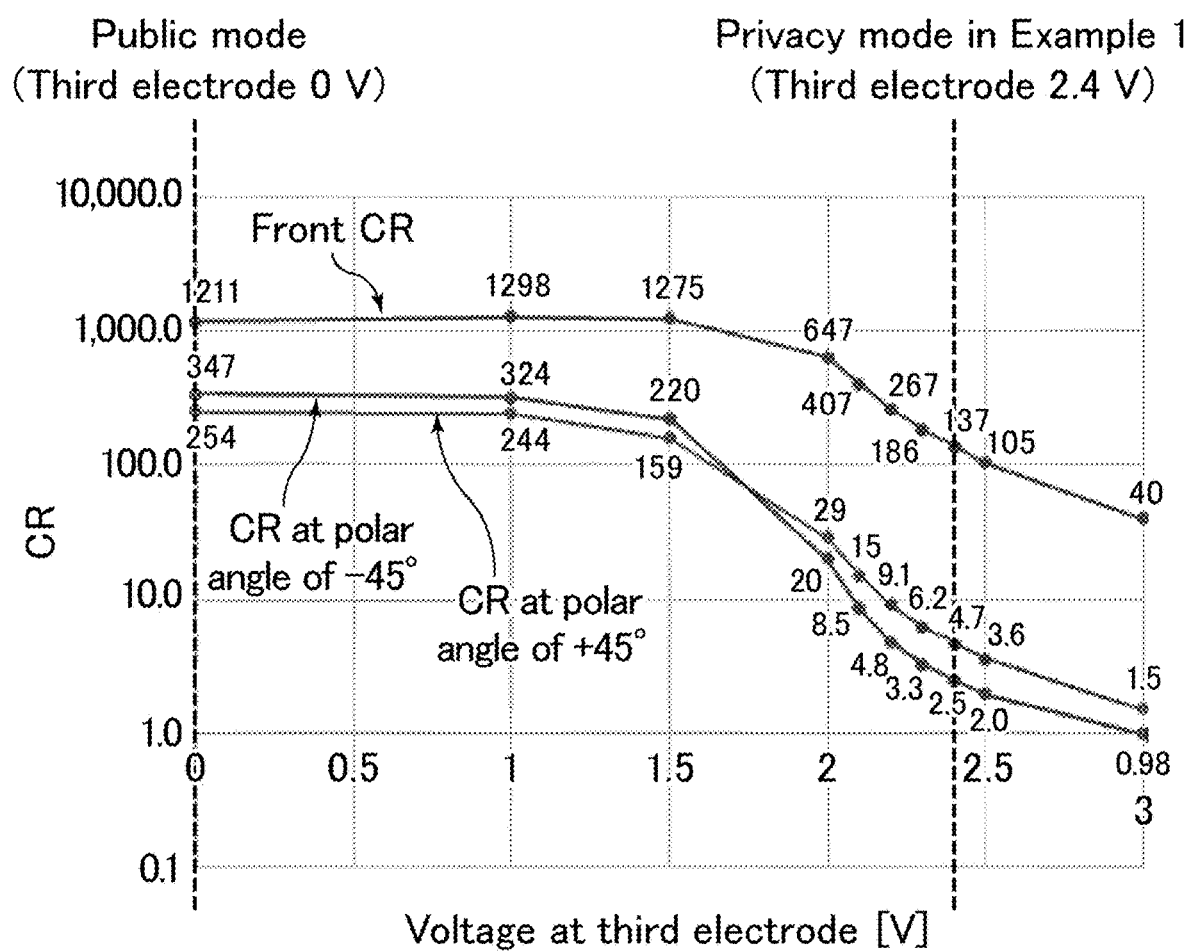
FIG. 26 shows simulation results of contrast ratio versus voltage applied to a third electrode in the liquid crystal display devices of Example 1 through Example 4.

In the privacy mode, simulation was performed on a liquid crystal display device of Example 2 in the same manner as in Example 1, except that an AC voltage of 2.3 V relative to the constant voltage was applied to the third electrode 34. In the privacy mode, simulation was performed on a liquid crystal display device of Example 3 in the same manner as in Example 1, except that an AC voltage of 2.2 V relative to the constant voltage was applied to the third electrode 34. In the privacy mode, simulation was performed on a liquid crystal display device of Example 4 in the same manner as in Example 1, except that an AC voltage of 2.1 V relative to the constant voltage was applied to the third electrode 34. The results are shown in Table 1 below and FIG. 26. FIG. 26 shows simulation results of contrast ratio versus voltage applied to a third electrode in the liquid crystal display devices of Example 1 through Example 4.

TABLE 1

|  | Public mode (third electrode 0 V) | | | | Privacy mode | | | | Voltage at third electrode [V] |
| --- | --- | --- | --- | --- | --- | --- | --- | --- | --- |
|  | Front | −45° | +45° | Ratio of +45°/−45° | Front | −45° | +45° | Ratio of +45°/−45° |  |
| Example 1 | 1211 | 347 | 254 | 0.73 | 137 | 2.5 | 4.7 | 1.88 | 2.4 V |
| Example 2 |  |  |  |  | 186 | 3.3 | 6.2 | 1.88 | 2.3 V |
| Example 3 |  |  |  |  | 267 | 4.8 | 9.1 | 1.90 | 2.2 V |
| Example 4 |  |  |  |  | 407 | 8.5 | 15 | 1.76 | 2.1 V |

As shown in FIG. 26 and Table 1, in Example 2 in which the voltage applied to the third electrode 34 was 2.3 V in the privacy mode, front CR was 186, CR at a polar angle of +45° was 6.2, CR at a polar angle of −45° was 3.3, and bilaterally asymmetric CR was obtained. As compared to Example 1, a higher front CR was obtained in Example 2, and visibility from the front was enhanced.

In addition, a combination of the liquid crystal panel of Example 2 and a louver having an asymmetric viewing angle (peak polar angle: +15°) can reduce oblique luminance, and accordingly, privacy protection can be further enhanced.

As shown in FIG. 26 and Table 1, in Example 3 in which the voltage applied to the third electrode 34 was 2.2 V in the privacy mode, front CR was 267, CR at a polar angle of +45° was 9.1, CR at a polar angle of −45° was 4.8, and asymmetric CR was obtained. As compared to Example 1, a higher front CR was obtained in Example 3, and visibility from the front was enhanced.

In addition, a combination of the liquid crystal panel of Example 3 and a louver having an asymmetric viewing angle and showing stronger light-shielding performance (peak polar angle: +15°) can reduce oblique luminance, and accordingly, privacy protection can be further enhanced.

As shown in FIG. 26 and Table 1, in Example 4 in which the voltage applied to the third electrode 34 was 2.1 V in the privacy mode, front CR was 407, CR at a polar angle of +45° was 15, CR at a polar angle of −45° was 8.5, and asymmetric CR was obtained. As compared to Example 1, a higher front CR was obtained in Example 4, and visibility from the front was enhanced.

In addition, a combination of the liquid crystal panel of Example 4 and a louver having an asymmetric viewing angle and showing stronger light-shielding performance (peak polar angle: +15°) can reduce oblique luminance, and accordingly, privacy protection can be further enhanced.

Example 5

A liquid crystal display device of Example 5 having a configuration similar to that of the liquid crystal display device 1000 of Embodiment 2 was fabricated. The liquid crystal display device of Example 5 had a dual-cell structure including the first liquid crystal panel 100A and the second liquid crystal panel 100B. The first liquid crystal panel 100A could reduce CR at a polar angle of −45° in the privacy mode, and the second liquid crystal panel 100B could reduce luminance (block light) at a polar angle of +45°. Accordingly, in the liquid crystal display device 1000 of Example 5, the first liquid crystal panel 100A and the second liquid crystal panel 100B were controlled independently of each other, and thereby switching to the privacy mode was enabled independently of each other at the left and right sides.

Example 6

Simulation was performed in a manner similar to Example 1 on a liquid crystal display device according to Example 6 having the same structure as in Example 1, except that each island-shaped electrode portion 35a had a length f of 3 μm. The liquid crystal display device 1000 of Example 6 satisfied Formula (1), Formula (1-1), Formula (1-2), and Formula (2) described above.

When the voltage applied to the third electrode 34 was 0 V, the liquid crystal display device of Example 6 had a contrast ratio of 250 at a polar angle of ±45°, and operated as a bilateral public mode. On the other hand, when the voltage applied to the third electrode 34 was 2.4 V, the liquid crystal display device of Example 6 had a contrast ratio of 2 at a polar angle of −45° (leftward direction), and a contrast ratio of 3.5 at a polar angle of +45° (rightward direction), and operated as the privacy mode having asymmetric viewing angle.

REFERENCE SIGNS LIST

- 1: gate line
- 2: source line
- 3: thin-film transistor (TFT)
- 10: active matrix substrate
- 11: first support substrate
- 12: first electrode
- 13: first insulating layer
- 14: second electrode
- 14a: first linear electrode portion
- 14b: aperture
- 20: liquid crystal layer (first liquid crystal layer)
- 21: liquid crystal molecules (first liquid crystal molecules)
- 30: counter substrate
- 31: second support substrate
- 32: color filter
- 32B: blue color filter
- 32G: green color filter
- 32R: red color filter
- 33: black matrix
- 34: third electrode
- 34a, 34b, 34x: second linear electrode portion
- 35: fourth electrode (floating electrode)
- 35a: island-shaped electrode portion
- 50: first dielectric layer
- 51: second dielectric layer
- 61: first polarizing plate
- 61A: first absorption axis
- 62: second polarizing plate
- 62A: second absorption axis
- 63: third polarizing plate
- 63A: third absorption axis
- 63B: third transmission axis
- 64: fourth polarizing plate
- 64A: fourth absorption axis
- 64B: fourth transmission axis
- 70, 70A, 70A1, 70A2, 71: pixel
- 70B: first blue pixel
- 70G: first green pixel
- 70R: first red pixel
- 71B: second blue pixel
- 71G: second green pixel
- 71R: second red pixel
- 72: display unit
- 72B: blue display unit
- 72G: green display unit
- 72R: red display unit
- 73: color element
- 100A, 100B: liquid crystal panel
- 101: first electrode drive circuit
- 102: second electrode drive circuit
- 103: third electrode drive circuit
- 200: control circuit
- 201: image signal synthesis circuit
- 202: display mode selection circuit
- 203: third electrode application voltage switching circuit
- 204: luminance modulation circuit
- 205: veil-view pattern database
- 211: raw image signal
- 212: image signal
- 213: display mode switching signal
- 214: first display mode selection signal
- 215: second display mode selection signal
- 216: driving voltage signal
- 217: constant voltage signal
- 218: luminance modulation signal
- 219: veil-view display switching signal
- 220: veil-view pattern image signal
- 300: backlight
- 301: backlight drive circuit
- 310: light guide plate
- 311: light source
- 312: light-shielding louver
- 312a: light transmission layer
- 312b: light-absorbing layer
- 313: reflective sheet
- 314: prism sheet
- 315: diffusing sheet
- 410: first substrate
- 411: third support substrate
- 412: fifth electrode
- 420: first alignment film
- 430: liquid crystal layer (second liquid crystal layer)
- 431: second liquid crystal molecules
- 431A: director
- 440: second alignment film
- 450: second substrate
- 451: fourth support substrate
- 452: sixth electrode
- 460: screen
- 1000: liquid crystal display device
- 1000A: optical aperture
- d, d1, d2: distance
- f: length
- gx, gy: width DL1: first direction
DL2: second direction
W, W34a, W34b, W35a1, W35a2: electrode width

What is claimed is:

1. A liquid crystal display device comprising:
a liquid crystal panel in which a plurality of pixels is arranged in a matrix pattern; and
a control circuit,
wherein the liquid crystal panel includes, sequentially, an active matrix substrate, a liquid crystal layer, and a counter substrate in the stated order,
the active matrix substrate includes, sequentially, a first electrode and a second electrode in the stated order, the second electrode including a first linear electrode portion extending in a first direction,
the counter substrate includes a third electrode and a fourth electrode, the third electrode including a plurality of second linear electrode portions extending in a second direction crossing the first direction, the fourth electrode including an island-shaped electrode portion as a floating electrode,
the island-shaped electrode portion is disposed between the plurality of second linear electrode portions in a plan view, and overlaps an optical aperture of one pixel of two pixels, in the plurality of pixels, that are adjacent to each other along the second direction, and does not overlap an optical aperture of the other pixel of the two pixels,
the control circuit performs control of switching between application of a driving voltage and application of a constant voltage to the third electrode,
the counter substrate further includes a black matrix including a portion extending in the second direction, and
the plurality of second linear electrode portions includes a second linear electrode portion that does not overlap the portion of the black matrix extending in the second direction and overlaps an optical aperture of at least one of the plurality of pixels in the plan view.

2. The liquid crystal display device according to claim 1, wherein a length f, in the second direction, of a region of the island-shaped electrode portion overlapping the optical aperture of the one pixel is 3 µm or more.

3. The liquid crystal display device according to claim 1, wherein
an electrode width W, in a direction perpendicular to the second direction, of the second linear electrode portion overlapping the optical aperture of the at least one of the plurality of pixels is 2.5 µm or more and 10 µm or less.

4. The liquid crystal display device according to claim 1, wherein a distance d, in a direction perpendicular to the second direction, between one of the second linear electrode portions and the island-shaped electrode portion adjacent to each other in the plan view is 2.5 µm or more and 7 µm or less.

5. The liquid crystal display device according to claim 1, wherein an electrode width W of each of the second linear electrode portions in a direction perpendicular to the second direction, a distance d in a direction perpendicular to the second direction between one of the second linear electrode portions and the island-shaped electrode portion adjacent to each other in the plan view, a length f, in the second direction, of a region of the island-shaped electrode portion overlapping the optical aperture of the one pixel, and a width gx of the optical aperture in the second direction satisfy Formula (1) and Formula (2) as follows:

$$d < W \quad \text{Formula (1)}$$

$$0.1 \times gx < 2 \times f \leq gx \quad \text{Formula (2).}$$

6. The liquid crystal display device according to claim 1, wherein the fourth electrode is disposed in a layer in which the third electrode is disposed.

7. The liquid crystal display device according to claim 1, the black matrix is on a side of the third electrode and the fourth electrode opposite the liquid crystal layer.

8. The liquid crystal display device according to claim 1, wherein the liquid crystal panel is a first liquid crystal panel,
the liquid crystal display device further comprises a second liquid crystal panel, and
the second liquid crystal panel is a liquid crystal panel capable of switching between a privacy mode and a public mode and having an asymmetric viewing angle in the privacy mode.

9. The liquid crystal display device according to claim 1, further comprising:
a backlight on or behind a back surface of the liquid crystal panel,
the backlight includes a light source and a light-shielding louver disposed closer to the liquid crystal panel than the light source is,
the light-shielding louver includes a linear light-absorbing layer, and
in the plan view, a direction in which the light-absorbing layer extends and the second direction are perpendicular to each other.

10. A liquid crystal display device comprising:
a liquid crystal panel in which a plurality of pixels is arranged in a matrix pattern; and
a control circuit,
wherein the liquid crystal panel includes, sequentially, an active matrix substrate, a liquid crystal layer, and a counter substrate in the stated order,
the active matrix substrate includes, sequentially, a first electrode and a second electrode in the stated order, the second electrode including a first linear electrode portion extending in a first direction,
the counter substrate includes a third electrode and a fourth electrode, the third electrode including a plurality of second linear electrode portions extending in a second direction crossing the first direction, the fourth electrode including an island-shaped electrode portion as a floating electrode,
the island-shaped electrode portion is disposed between the plurality of second linear electrode portions in a plan view, and overlaps an optical aperture of one pixel of two pixels, in the plurality of pixels, that are adjacent to each other along the second direction, and does not overlap an optical aperture of the other pixel of the two pixels,
the control circuit performs control of switching between application of a driving voltage and application of a constant voltage to the third electrode, and
the island-shaped electrode portion includes a first portion that overlaps the optical aperture of the one pixel and a second portion that does not overlap an optical aperture of any of the plurality of pixels in the plan view.

11. The liquid crystal display device according to claim 10, wherein the first portion and the second portion of the island-shaped electrode portion are arranged continuously along the second direction.

12. The liquid crystal display device according to claim 10, wherein the island-shaped electrode portion has an elongated shape, and a lengthwise direction of the elongated shape extends along the second direction.

13. The liquid crystal display device according to claim 10,
wherein the counter substrate further includes a black matrix, and
the second portion of the island-shaped electrode portion overlaps at least a portion of the black matrix in the plan view.

14. The liquid crystal display device according to claim 13,
wherein the black matrix includes a portion extending in the first direction, and
the second portion of the island-shaped electrode portion overlaps the portion of the black matrix extending in the first direction in the plan view.

* * * * *